(12) United States Patent
Vaghi

(10) Patent No.: US 6,376,783 B1
(45) Date of Patent: Apr. 23, 2002

(54) REMOVABLE ELECTRONIC SCALE CARTRIDGE, AND A SYSTEM AND METHOD WHICH USES THE SCALE CARTRIDGE TO COMPUTE POSTAL/CARRIER RATES

(75) Inventor: Nino Vaghi, McLean, VA (US)

(73) Assignee: Vaghi Family Intellectual Properties, LLC, McLean, VA (US)

( * ) Notice: Subject to any disclaimer, the term of this patent is extended or adjusted under 35 U.S.C. 154(b) by 0 days.

(21) Appl. No.: 09/584,098

(22) Filed: May 31, 2000

(51) Int. Cl.⁷ .................. G01G 19/40; G01G 21/28
(52) U.S. Cl. ............. 177/25.15; 177/168; 177/170; 177/230; 177/231; 177/238; 177/244; 177/253; 177/255; 177/261; 177/262; 705/401; 705/407
(58) Field of Search .................. 177/25.11, 25.12, 177/25.13, 25.15, 124, 126, 127, 245, 238, 239, 240, 241, 242, 243, 244, 168, 170, 230, 231, 253, 255, 261, 154, 187, 262; 705/401, 407

(56) References Cited

U.S. PATENT DOCUMENTS

| | | | |
|---|---|---|---|
| 3,591,221 A | | 7/1971 | Alley |
| 4,120,371 A | * | 10/1978 | Zohn et al. .................. 177/262 |
| 4,139,892 A | | 2/1979 | Gudea et al. |
| 4,456,085 A | * | 6/1984 | Boyes ........................ 177/256 |
| 4,582,151 A | * | 4/1986 | Mairot et al. ................ 177/144 |
| 4,586,575 A | * | 5/1986 | Müerdter et al. ........... 177/124 |
| 4,597,457 A | | 7/1986 | Ikekita |
| 4,638,439 A | | 1/1987 | Daniels |
| 4,700,656 A | * | 10/1987 | Cone et al. .................. 177/245 |
| 4,726,435 A | * | 2/1988 | Kitagawa et al. ............ 177/187 |
| 4,754,653 A | | 7/1988 | Hafner et al. |
| 4,778,017 A | * | 10/1988 | Liang .......................... 177/187 |
| 4,799,559 A | * | 1/1989 | Müerdter et al. ........... 177/124 |
| 4,814,995 A | | 3/1989 | Daniels, Jr. |
| D302,798 S | | 8/1989 | Wolff, Jr. |
| 4,880,069 A | * | 11/1989 | Bradley ....................... 177/211 |
| D305,103 S | | 12/1989 | Kennedy |
| 5,139,100 A | * | 8/1992 | Brauneis ..................... 177/245 |
| D329,227 S | | 9/1992 | Kurth et al. |
| 5,307,281 A | * | 4/1994 | Wollmann ................... 177/262 |
| 5,438,496 A | * | 8/1995 | Meur et al. ................. 705/401 |

(List continued on next page.)

OTHER PUBLICATIONS

Internet.com, "Notebook Computer" pub. date unknown, web page from http://isp.webopedia.com.
Internet.com, "Personal Computer" pub. date unknown, web page from http://isp.webopedia.com.

*Primary Examiner*—Randy W. Gibson
(74) *Attorney, Agent, or Firm*—Samuel W. Ntiros

(57) ABSTRACT

An electronic scale cartridge plugs into a piece of office equipment and/or a portable electronic device to provide a weight signal to be used in computing a postal or private carrier rate. The piece of office equipment may be a personal computer or one of its peripheral or input devices. The portable electronic device may be a personal digital assistant or a wireless communications device. Preferably, the scale cartridge has a connector which fits a universal or standard port, thereby allowing the cartridge to be connected to any number of devices without modification. Postage is computed in accordance with a program stored in the computer or portable device. Preferably, the program is written to step a user through a postage-computing process using one or more interactive display screens. A second type of electronic scale is adapted for attachment to a piece of equipment using any one of a variety of fasteners which may establish a removable and/or rotatable connection to the equipment. A third type of weighing arrangement includes a docking station adapted for connection to a scale cartridge and for supporting the equipment.

48 Claims, 33 Drawing Sheets

U.S. PATENT DOCUMENTS

| | | |
|---|---|---|
| 5,443,320 A | 8/1995 | Agata et al. |
| 5,496,085 A * | 3/1996 | Demar et al. ............... 177/126 |
| 5,521,596 A | 5/1996 | Selker et al. |
| 5,559,932 A | 9/1996 | Machida et al. |
| 5,606,507 A | 2/1997 | Kara |
| 5,615,120 A | 3/1997 | Schwartz et al. |
| 5,724,245 A | 3/1998 | Maher et al. |
| 5,752,049 A | 5/1998 | Lee |
| 5,773,767 A * | 6/1998 | Collins, Jr. et al. ......... 177/126 |
| 5,933,166 A | 8/1999 | Andrews et al. |
| 5,980,010 A | 11/1999 | Stephenson |
| 6,013,878 A * | 1/2000 | Schwartz et al. ........ 177/25.13 |
| 6,037,548 A * | 3/2000 | Baitz et al. .................. 177/238 |
| 6,064,991 A * | 5/2000 | Reisinger et al. ........... 705/401 |
| 6,194,671 B1 * | 2/2001 | Vaghi ...................... 177/25.15 |
| 6,249,778 B1 * | 6/2001 | Vaghi ......................... 705/407 |

\* cited by examiner

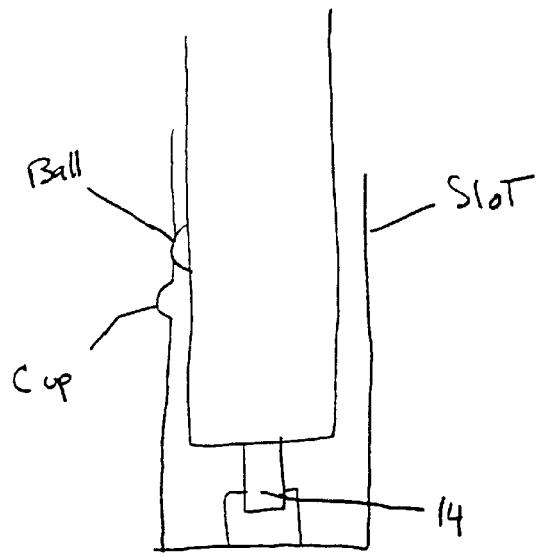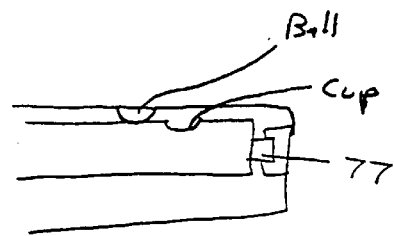
Fig. 15(a)  Fig. 15(b)
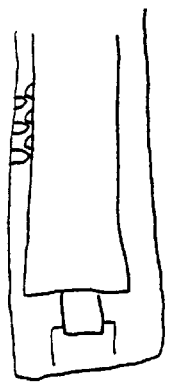
Fig. 15(c)

REMOVABLE ELECTRONIC SCALE CARTRIDGE, AND A SYSTEM AND METHOD WHICH USES THE SCALE CARTRIDGE TO COMPUTE POSTAL/CARRIER RATES

BACKGROUND OF THE INVENTION

1. Field of the Invention.

This invention generally relates to weighing systems, and more particularly to an electronic scale and a system and method which uses the electronic scale to compute postal and private carrier rates for letters, packages, parcels, and other items of mail.

2. Description of the Related Art.

Even with E-mail and other forms of electronic data transfer which are so prevalent today, traditional mail, either through the U.S. Postal Service or by private carrier, remains the dominant form of information exchange. In order to successfully send an item through the mail, correct postage must, of course, be computed. To determine postage, a number of factors must be taken into consideration, not the least of which include the class, destination, and weight of the item being sent. At least three methods are currently in use for determining the weight of mail, and as will be apparent below all of them fall short of being optimum.

The traditional method of weighing mail involves using an analog scale. According to this method, a letter is weighed on the scale and postage is then determined by comparing the scale measurement to a rate table issued by a mail carrier. This method has proven to be inefficient, especially for businesses, because it is an entirely manual process. To mail a letter, for example, a secretary is often required to go to a mail room to access the scale and rate tables. In other instances, the scale is kept at the secretary's desk, making a trip to the mail room unnecessary. Even under these circumstances, however, the process is inefficient because keeping the scale on the secretary's desk reduces her usable work space. Either way, the traditional method of computing postage is inefficient.

An improved method of computing postage involves using an electronic, programmable postal meter. Electronic postal meters are highly favored by businesses because they essentially automate the mailing process. While meters of this type come in varying sizes, from small stand-alone units to full-size systems capable of weighing packages of varying weights and sizes, all have the same basic features: a keyboard for entering rate data into a meter memory, an electronic scale, and a processor for computing postage based on the stored rate data and weight measurements taken by the scale. U.S. Pat. Nos. 5,724,245, 5,615,120, 4,814,995, and D 305,103 disclose meters of this type.

In spite of their advantages, electronic postal meters have at least three drawbacks. First, postal meters cannot be bought but only rented for a fee. These rental fees contribute to operating expenses, and sometimes significantly depending upon the size of the renter.

Second, electronic postal meters require considerable maintenance because, one, the scales connected to the meters must be manually adjusted every time new postal rates are issued and, two, the meters must be periodically inspected, serviced, and replaced, often at additional expense to the renter.

Third, most electronic postal meters in use today are of a size which, in practical terms, are unsuitable for use on a worker's desk. Consequently, postal meters are almost universally kept in mail rooms and thus have associated with them many of the inefficiencies attendant to analog scales.

A further improved method of computing postage borrows from the power of the personal computer. This method eliminates the need for electronic postal meters because the functions performed by the meter processor are replaced by a CPU running a postal computation program. Computer programs of this type, exemplified by U.S. Pat. No. 5,606,507 to Kara, are typically Windows-type programs which automatically compute postage based on weight measurements taken by an electronic scale connected to a communications port of the computer. Once postage has been computed, the program instructs a peripheral device to print an envelope or label bearing a stamp of appropriate value.

Use of a personal computer to compute postage represents a significant improvement in the art. Through the computer, a secretary can, for example, perform all mailing responsibilities at her desk, thereby streamlining the mailing process. Further, through a convenient and easily understandable graphic user interface, novices can in no time learn to use the postal program with a proficiency equal to that of trained personnel. Also, because postal programs can be purchased, they do not represent a continuing economic burden on the businesses which use them.

For all of their advantages, software-based mailing systems are not optimum because they are not fully integrated. Perhaps most significantly, while the processing functions of the electronic postal meter have been incorporated into the personal computer, its hardware components have not. This is exemplified by systems like Kara, discussed above, which must still use an electronic scale separate from the computer to obtain the weight measurements required for computing postage. Use of a separate scale is inefficient because, like an analog scale, it consumes desk space which could be put to more productive use.

A need therefore exists for a system for computing postal and carrier rates which is integrated so that desk space is not unnecessarily consumed and which therefore is more convenient and efficient compared with postage-computing systems presently in use.

SUMMARY OF THE INVENTION

It is one object of the present invention to provide a system for computing postage and/or private carrier rates which is more efficient than those presently in use.

It is another object of the present invention to achieve the above object by providing an electronic scale cartridge which is adapted for removable connection to a piece of office equipment, so that all elements for computing rates are conveniently located at a user's work area, thereby streamlining the mailing process and increasing the effective work space of an individual in a home or business environment.

It is another object of the present invention to provide an electronic scale cartridge which is adapted for removable connection to a portable electronic device such as a personal digital assistant, wireless communications device, or other hand-held or transportable system equipped with computing capability, thereby enabling a user to determine postal and/or carrier rates when on travel or otherwise away from the office.

It is another object of the present invention to provide an electronic scale cartridge which has a connector that fits a universal or standard port or signal format, thereby allowing the invention to interface to any number of devices without modification.

It is another object of the present invention to provide a software-driven system and method which computes postal and/or carrier rates based on weight signals derived from the aforementioned type of electronic scale.

It is another object of the present invention to provide an electronic scale which is adapted for connection to a piece of equipment, which connection is preferably rotatable to allow a user to move the scale into an optimum position for weighing.

It is another object of the present invention to provide an electronic scale having a housing which is adapted for removable connection to a piece of office equipment.

It is another object of the present invention to provide a docking station which is adapted to receive the electronic scale cartridge of the present invention and which also has a surface for supporting a piece of office equipment, which docking station thereby increases integration of elements required to compute postage in accordance with the software-driven system and method of the present invention.

The foregoing and other objects of the invention are achieved by providing an electronic scale cartridge which plugs into a piece of office equipment and/or a portable electronic device. The scale cartridge includes a platform for supporting an item of mail, a weighing unit having a force transducer which outputs a signal indicative a weight of the item, and an electrical connector which removably mates with a complementary connector in the piece of office equipment and/or portable electronic device. In operation, the scale connector outputs the weight signal from the force transducer into the complementary connector of the piece of office equipment or portable electronic device. The weight signal is then passed to a display for viewing and/or to a processor which computes a corresponding postal or private carrier rate.

For convenience of use, the scale cartridge may be removed simply by pulling it from the complementary connector. Because the cartridge is easily removable, it may be upgraded or downgraded to suit the needs of the user. For example, the cartridge may be adapted to be interchangeable with cartridges of different load cell capacities. Further, the removable connection allows damaged or defective cartridges to be easily replaced.

The weighing unit may be any type capable of meeting the size requirements of the cartridge housing. For example, the weighing unit has none or a limited number of moving parts, and the force transducer may be of any type conventionally known including but not limited to load cells, strain gauges, and piezoelectric or piezoresistive elements. Also, the housing of the cartridge may be horizontally or vertically oriented to suit, for example, the space requirements of a user's work area.

In one embodiment, the weighing unit includes two support members for supporting the platform and a force transducer mounted at a position underneath the platform. When an item of mail is placed on the scale, the scale platform applies a force against the force transducer and a weight signal is output. The support member may be spring loaded for enhanced stability, and a stub may be included on a lower surface of the platform to transfer the weight of the item to the force transducer.

In another embodiment, the platform applies a force directly against the force transducer when an item of mail is placed on the platform. This may be achieved, for example, by connecting the platform to the force transducer by screws or another form of attachment. Alternatively, the platform may be sized to be slightly greater than the housing of the cartridge so that the housing provides horizontal stability, thereby leaving the platform rest by force of gravity against the force transducer. The weighing unit of this embodiment, thus, effectively has no moving parts.

In another embodiment, the platform has a stub on its lower surface that applies a force against the force transducer, which may or may not be connected to the stub. In this arrangement, the stub may be connected to the force transducer, or alternatively the housing of the cartridge may provide the horizontal stability required to allow the stub to rest by force of gravity against the force transducer. This embodiment also effectively has no moving parts.

In another embodiment, the platform dimensions may be smaller than the housing so that the housing walls provide the horizontal stability to the platform during weighing. To allow the weight of a mail item to be accurately transferred to the force transducer, the platform may be raised in relation to the housing walls, but in a way that still provide direct contact between the lower surface of the platform and the load cell.

In another embodiment, the weighing unit includes a support member in the form of a pivot arm having a first end in contact with the platform and a second end rotatably mounted to a surface within the cartridge housing. In operation, the arm pivots to apply a force against the force transducer which corresponds to the weight of an item placed on the platform.

In another embodiment, the scale cartridge may have a housing adapted for insertion into a slot formed in the piece of office equipment (e.g., a computer or one of its peripheral or input devices) or portable electronic device (e.g., a personal digital assistant or wireless communications device equipped with computing capability). The housing may have a horizontal orientation or a vertical orientation.

A number of optional features may be included on each of the embodiments of the scale cartridge of the present invention. For example, a printed circuit board may be included in the cartridge housing for converting the weight signal to a format compatible with any number of signal standards. Alternatively, the force transducer may output the weight signal directly. Also, the platform of the scale may be removably mounted to the weighing unit to allow other platforms of different shapes or dimensions to be connected.

The system of the present invention advantageously uses the removable scale cartridge to compute postal/private carrier rates in accordance with a program stored in a personal computer or electronic device. If desired, the program may be obtained from an application service provider through a network connection. In operation, the program computes these rates based on weight measurement signals derived from the scale, as well as other mailing parameters entered, for example, by keyboard or mouse.

The method of the present invention is implemented in accordance with the system described above. According to this method, postal/carrier rate information is loaded into the computer or device manually, from a disk, or from a network such as the Internet. A postal program is then initiated, for example, by clicking an icon on the computer or device screen or merely by placing an item to be weighed on the scale. The program may have been previously stored in a memory of the computer or device, or may be accessed from an application service provider or other client-server source. Once initiated, the program computes a rate based on a weight measurement signal from the scale and/or class, zone, and other parameters entered by the user or pre-programmed into the system. If desired, the program may be written so that these parameters are entered in response to requests sequentially displayed on the computer screen. A label or envelope bearing a mark corresponding to the postal rate is then printed either by a peripheral connected to the computer or device or by a printer integrated in the computer or device.

The present invention is also an electronic scale which is adapted for attachment to a piece of equipment. This embodiment of the scale includes a housing, a platform for supporting an item of mail, a weighing unit mounted at least partially within the housing and having a force transducer which outputs a weight signal corresponding to a weight of the item supported on the platform, and a fastener which fastens the housing of said scale to a piece of equipment. The fastener may one which removably and/or rotatably attaches the scale to the piece of equipment. The rotatable attachment is especially advantageous because it allows a user to adjust the scale to a level position regardless of the inclination of the equipment surface to which it is attached. In one embodiment, the fastener includes snap members. In other embodiment, the fastener is a magnet. In still other embodiments, the fastener takes the form of a removable pin, a screw, an adhesive, a clip which is preferably spring biased for enhanced stability, and even a velcro arrangement.

Finally, the present invention is a weighing arrangement that includes any one of the scale cartridges previously described which is adapted for insertion into a docking station. To provide enhanced office integration, the docking station may have a surface for supporting a piece of equipment, as well as a slot having a complementary connector adapted for coupling to the scale cartridge.

BRIEF DESCRIPTION OF THE DRAWINGS

FIGS. 15(a) and 15b) are diagrams of exemplary cup-and-ball arrangements which may be used to hold the removable scale cartridge of the present invention within a slot in a piece of office equipment or portable electronic device, and FIG. 15(c) is an exemplary tongue-and-groove arrangement.

DESCRIPTION OF THE PREFERRED EMBODIMENTS

The present invention is, in one respect, an electronic scale cartridge adapted for insertion into a piece of office equipment for reducing desk clutter and thus maximizing the efficient use of an employee's work space. The present invention is also an electronic scale cartridge adapted for coupling to a portable electronic device of a type commonly used by persons on travel or otherwise away from the home or office. The present invention is also a software-driven system which uses the integrated electronic scale to automatically compute postal (domestic and international) and/or private carrier rates for letters, packages, parcels, and other items to be mailed or shipped. The present invention is also a method for determining these rates in accordance with the system described herein. The present invention is also an electronic scale adapted to be attached to a piece of equipment by a fastener. The present invention is also a weighing arrangement which has a surface for supporting a piece of equipment and a connector for receiving the scale cartridge of the present invention. These and other aspects of the present invention are discussed in seriatim below with reference to FIGS. 1–28.

The scale cartridge of the present invention includes a platform connected to a weighing unit which is at least partially enclosed within a vertically oriented housing. The weighing unit contains a force transducer which may be any type conventionally known including but not limited to load cells, strain gauges, piezoelectric/ piezoresistive sensors, or vibration sensors. U.S. Pat. Nos. 3,591,221, 4,139,892, 4,754,653, and 5,521,596 disclose illustrative force-transducer arrangements which may be included in the weighing unit of the present invention. Those skilled in the art can appreciate, however, that other types of arrangements may also be used. In operation, an item to be mailed (e.g., a letter enclosed in an envelope) is placed on the platform by a user. The weighing unit then outputs a signal indicative of the weight of the mail item through an electrical connector of the cartridge.

Figure 1A:
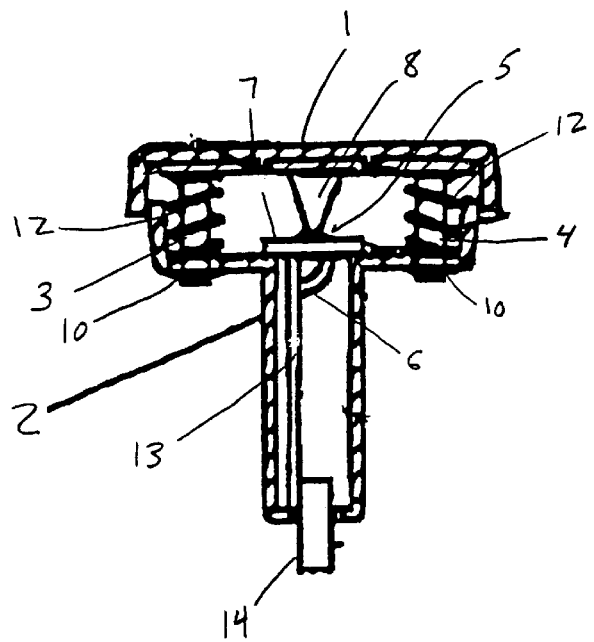
FIG. 1(a) is a diagram of a first embodiment of the removable electronic scale cartridge of the present invention.
Figure 1B:
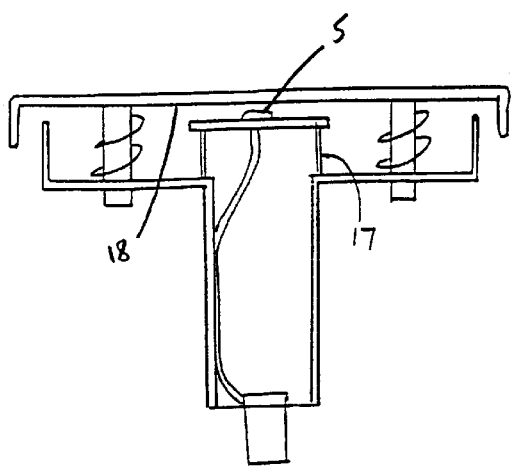
FIG. 1(b) is a diagram of an alternative arrangement of the first embodiment of the removable electronic scale cartridge of the present invention.

Referring to FIG. 1(a), a first embodiment of the scale cartridge of the present invention includes a pair of support shafts 3 and 4 and a force transducer in the form of load cell 5. The load cell is fixed to a base 7 at a position directly underneath a stub 8 projecting from a lower surface of the platform, and the base is mounted to internal support points along horizontal surfaces of the housing. Holes 10 are respectively formed in the horizontal surfaces to provide clearance for the shafts and thus to allow stub 8 to impinge against the load cell when an item of mail is placed on the platform. Preferably, as shown, the support shafts are equipped with springs 12 to give the platform a predetermined bias. Additional supports (not shown) may be included, as necessary, for increasing the stability of the support shafts.

In operation, the weight of a mail item on the platform which causes stub 8 to impinge upon load cell 5. The load cell converts this force into a weight signal which is then conveyed to an electrical connector 14 via signal wire 6. The weight signal may be output through connector 14 without processing or may be processed by a printed circuit board 13 prior to output through the connector. Printed circuit board 13 may, for example, convert the weight signal output from the load cell into a format compatible with any one of a number of signal formats or connector types. If, for example, if the scale cartridge is adapted for connection to a personal computer (e.g., a desk-top, laptop, notebook, etc.), the connector may be a serial or parallel connector.

More specialized configurations are also possible. For example, the connector may have a pin configuration which complies with a PCMCIA-type connector. If the scale cartridge is adapted for connection to a portable electronic device (e.g., a personal digital assistant, a portable wireless device, etc.), the connector may output weight signals which comply with the Universal Serial Bus (USB) standard. As those skilled in the art can appreciate, these connectors/standards are merely illustrative of the present invention, as connector 14 may be constructed to interface with virtually any other type of port or signal standard. Further, if desired, the removable electronic cartridge of the present invention may be equipped with multiple types of connectors for enhanced capability.

FIGS. 1(b)–1(f) show alternative configurations for the first embodiment of the electronic scale cartridge of the present invention. Where applicable, like reference numerals have been used. The FIG. 1(b) configuration is the same as the one shown FIG. 1(a) except that stub 8 is removed from the lower surface of the platform and load cell 5 is mounted on a raised base 17. When an item of mail is placed on the platform, the lower surface 18 of the platform applies a force directly on the load cell and a corresponding weight signal is output.

Figure 1C:
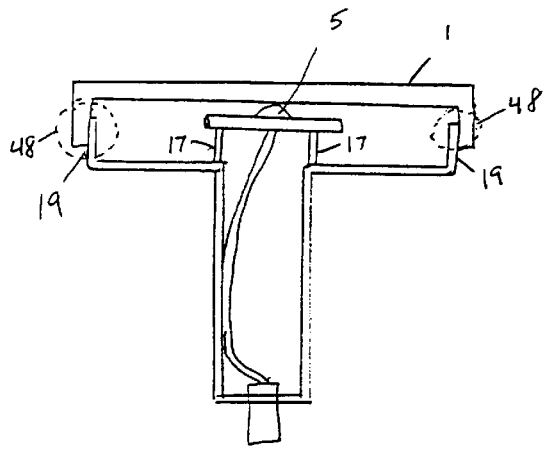
FIG. 1(c) is a diagram of an alternative arrangement of the first embodiment of the removable electronic scale cartridge of the present invention.

The FIG. 1(c) configuration places platform 1 into direct contact with load cell 5. However, unlike FIG. 1(b), no support members are included. If desired, platform 1 may be connected to the load cell by a screw or other type of attachment. Otherwise, platform 1 may be held against the load cell by force of gravity and the platform is prevented from tilting as a result of the cartridge housing walls. As a result, the inside surfaces of the housing prevent the platform from tilting while simultaneously allowing the platform to transfer a force equal to the weight of the mail item to load cell 5. If desired, any one of a variety of friction reducing elements (tape, plastic film, fluids, etc.) may be applied between t he opposing surfaces 48 of the cartridge housing. As in the previous configurations, a printed circuit board may be included for signal conversion. The FIG. 1(c) embodiment thus incorporates what is effectively a no-moving-parts scale.

Figure 1D:
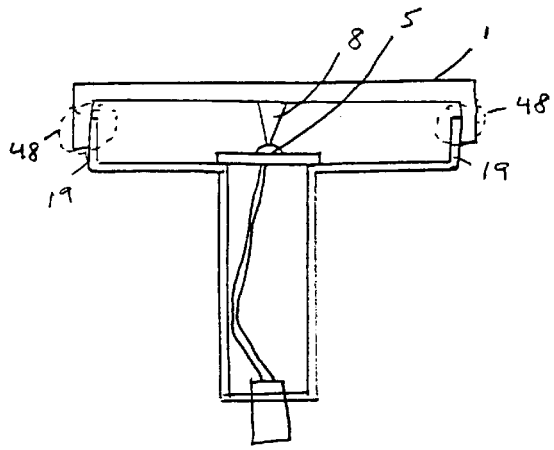
FIG. 1(d) is a diagram of another alternative arrangement of the first embodiment of the removable electronic scale cartridge of the present invention.

The FIG. 1(d) configuration is similar to FIG. 1(c) except that stub 8 is in direct contact with load cell 8.

The FIG. (e) configuration is similar to FIG. 1(c) except that the platform 1 has dimensions which are smaller than the housing. As a result, the inside surfaces of the cartridge housing 19 prevent the platform from tilting while simultaneously allowing the platform to transfer a force equal to the weight of the mail item to load cell 5. Further, the platform is held above the cartridge walls 19 as a result of raised supports 17. This enables the weighing unit to capture a truer reading of the weight of the mail item. If desired, any one of a variety of friction reducing elements (tape, plastic film, fluids, etc.) may be applied between the opposing surfaces 48 of the cartridge housing.

Figure 1E:
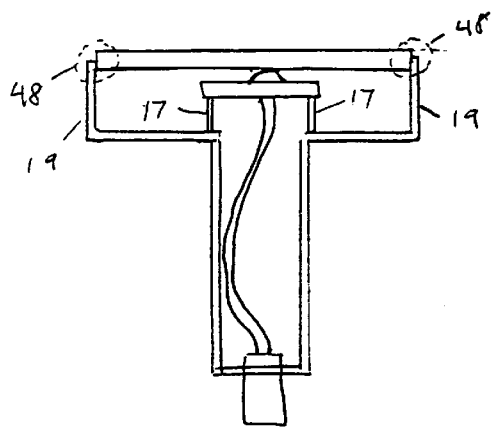
FIG. 1(e) is a diagram of another alternative arrangement of the first embodiment of the removable electronic scale cartridge of the present invention.
Figure 1F:
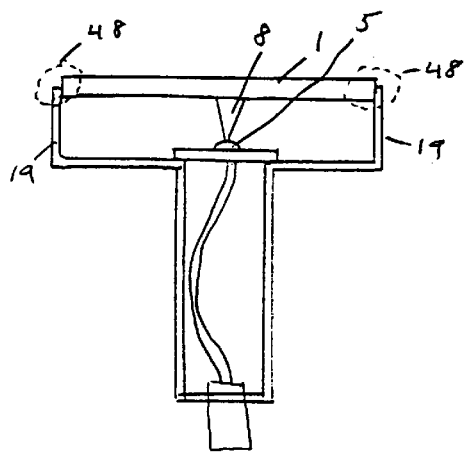
FIG. 1(f) is a diagram of another alternative arrangement of the first embodiment of the removable electronic scale cartridge of the present invention.

The FIG. 1(f) configuration is the same as FIG. 1(e) except that stub 8 directly contacts the load cell 5.

FIGS. 2 through 7 show the removable scale cartridge of the present invention connected to various pieces of office equipment. Where applicable, like numerals have been used to identify the features of the cartridge depicted in each of the figures. Also, in each embodiment, it is assumed that the force transducer of the present invention receives power from a power source of the office equipment. If desired, however, the cartridge may be adapted to include a battery as an alternative power source.

Figure 2:
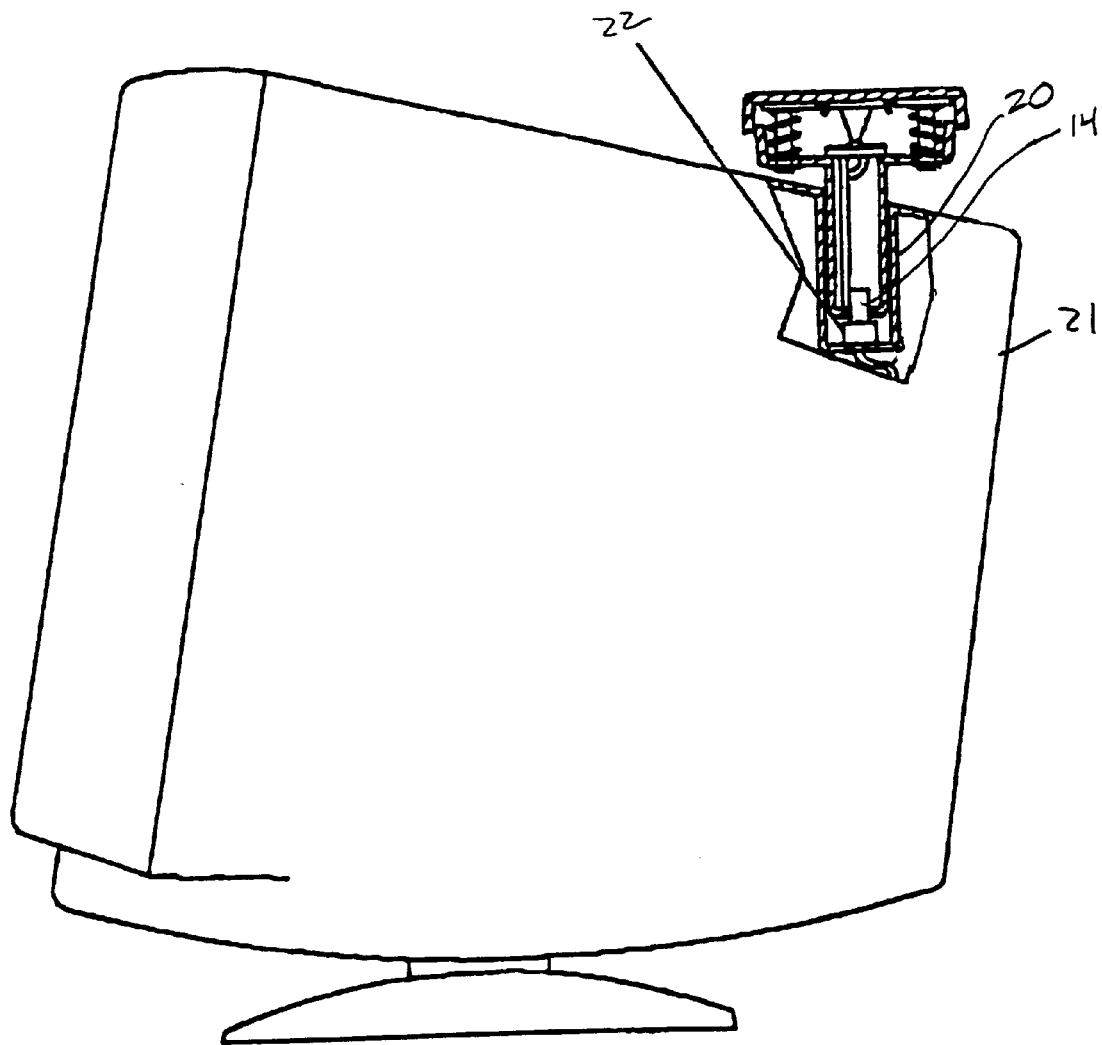
FIG. 2 is a diagram of the first embodiment of the removable scale cartridge of the present invention inserted into a CRT monitor of a personal computer.

FIG. 2 shows the removable scale cartridge of the present invention inserted into a slot 20 formed in a housing 21 of a CRT monitor. Formed at the bottom of slot 20 is a complementary connector 22 adapted to mate with connector 14 projecting from the cartridge. While slot 20 is illustratively shown as being formed along a top of the CRT monitor, those skilled in the art can appreciate this slot may be formed along another surface of the monitor. For example, for convenience purposes, the slot may be formed along one of the side, top, or bottom surfaces of the monitor.

Figure 3:
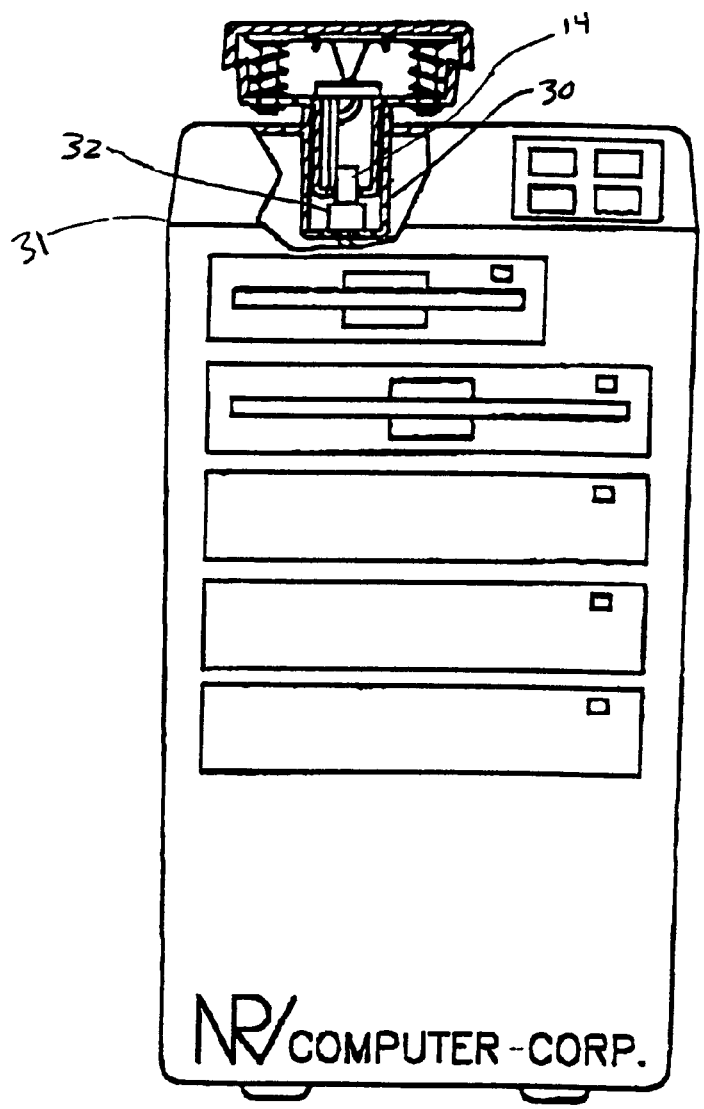
FIG. 3 is a diagram of the first embodiment of the removable scale cartridge of the present invention inserted into the CPU of a personal computer.

FIG. 3 shows the removable scale cartridge of the present invention inserted into a slot 30 formed in a housing 31 of a CPU of a personal computer. Formed at the bottom of slot 30 is a complementary connector 32 adapted to mate with connector 14 projecting from the cartridge. While slot 30 is illustratively shown as being formed along a top of the CPU, those skilled in the art can appreciate that this slot may be formed along any other surface. Also, while the CPU units depicted has a tower configuration, those skilled in the art can appreciate that the scale of the present invention may be adapted for insertion into the housing of any other type of CPU unit.

Figure 4:
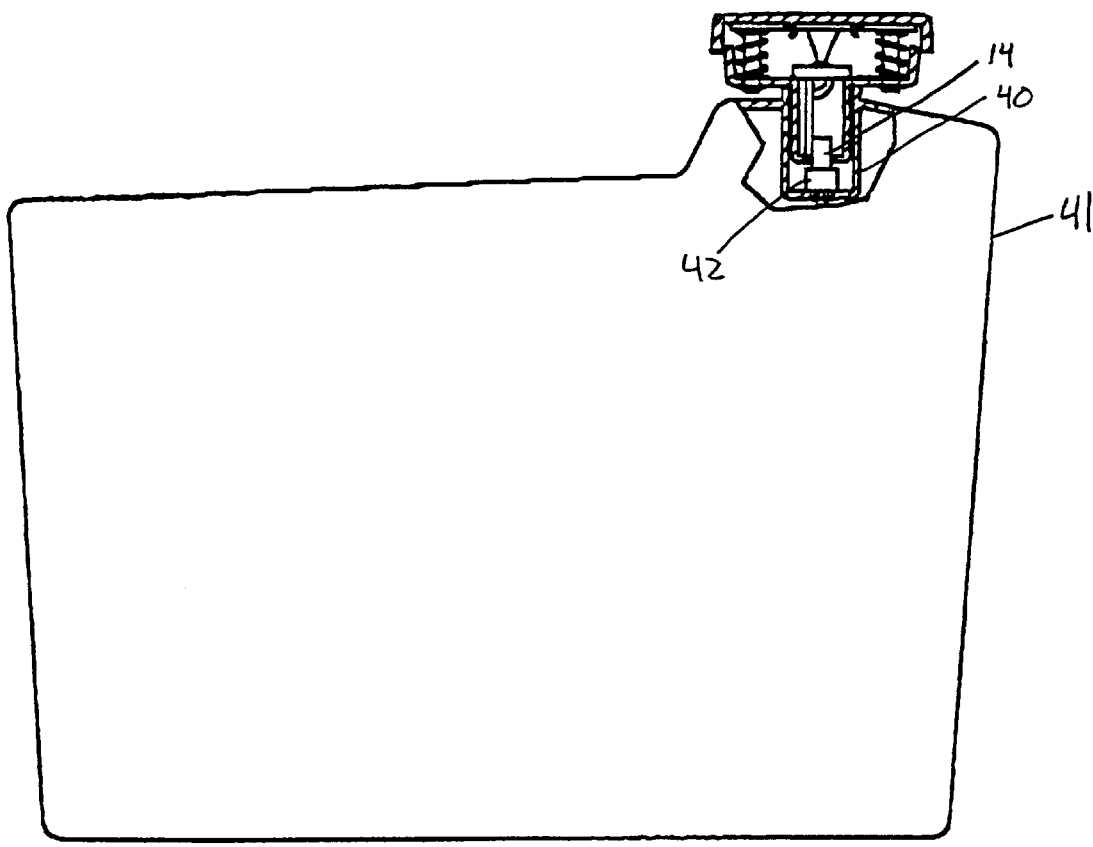
FIG. 4 is a diagram of the first embodiment of the removable scale cartridge of the present invention inserted into a printer.

FIG. 4 shows the removable scale cartridge of the present invention inserted into a slot 40 formed in a housing 41 of a printer. Formed at the bottom of slot 40 is a complementary connector 42 adapted to mate with connector 14 projecting from the cartridge. While slot 40 is illustratively shown as being formed along a top of the CRT, those skilled in the art can appreciate that this slot may be formed along any other surface.

Figure 5A:
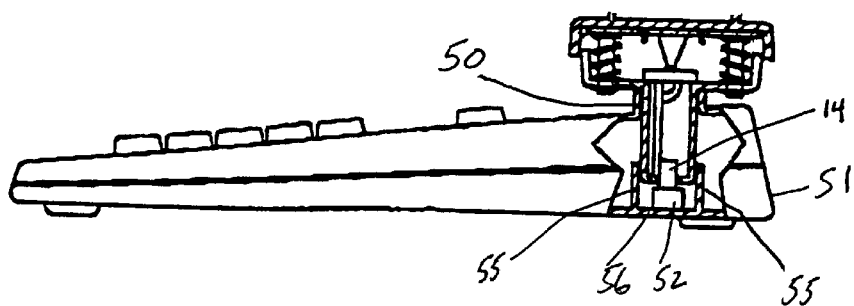
FIG. 5(a) is a diagram of the first embodiment of the removable scale cartridge of the present invention inserted along a top surface of a keyboard.
Figure 5B:
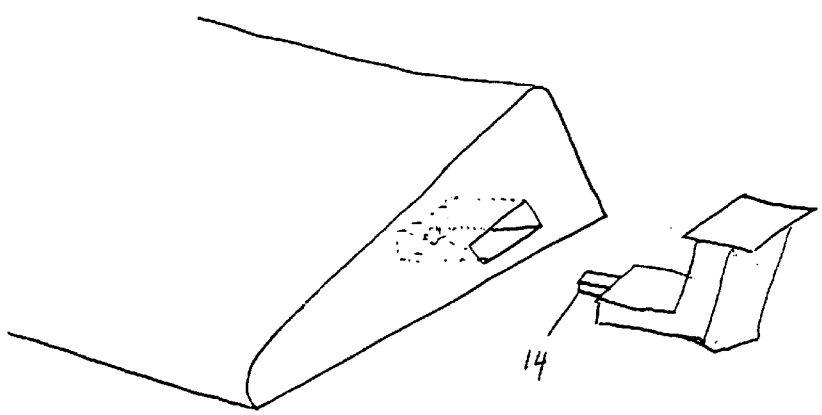
FIG. 5(b) is a diagram of an alternative configuration of the first embodiment of the removable scale cartridge inserted along a side surface of a keyboard.

FIG. 5(a) shows the removable scale cartridge of the present invention inserted into a slot 50 formed in a housing 51 of a keyboard. The slot may be continuous in accordance with the other embodiments, or as shown, discontinuous with guides 55 projecting upwardly from a base 56 internal to the keyboard. Formed at the bottom of slot 50, or guides 55, is a complementary connector 52 adapted to mate with connector 14 projecting from the cartridge. While slot 50 is illustratively shown as being formed along a top of the keyboard, those skilled in the art can appreciate that this slot may be formed along any other surface. Such an alternative slot location may, for example, reside along a side of the keyboard. For such a slot, the removable scale cartridge of the present invention may have an L-shaped housing as shown in FIG. 5(b).

Figure 6:
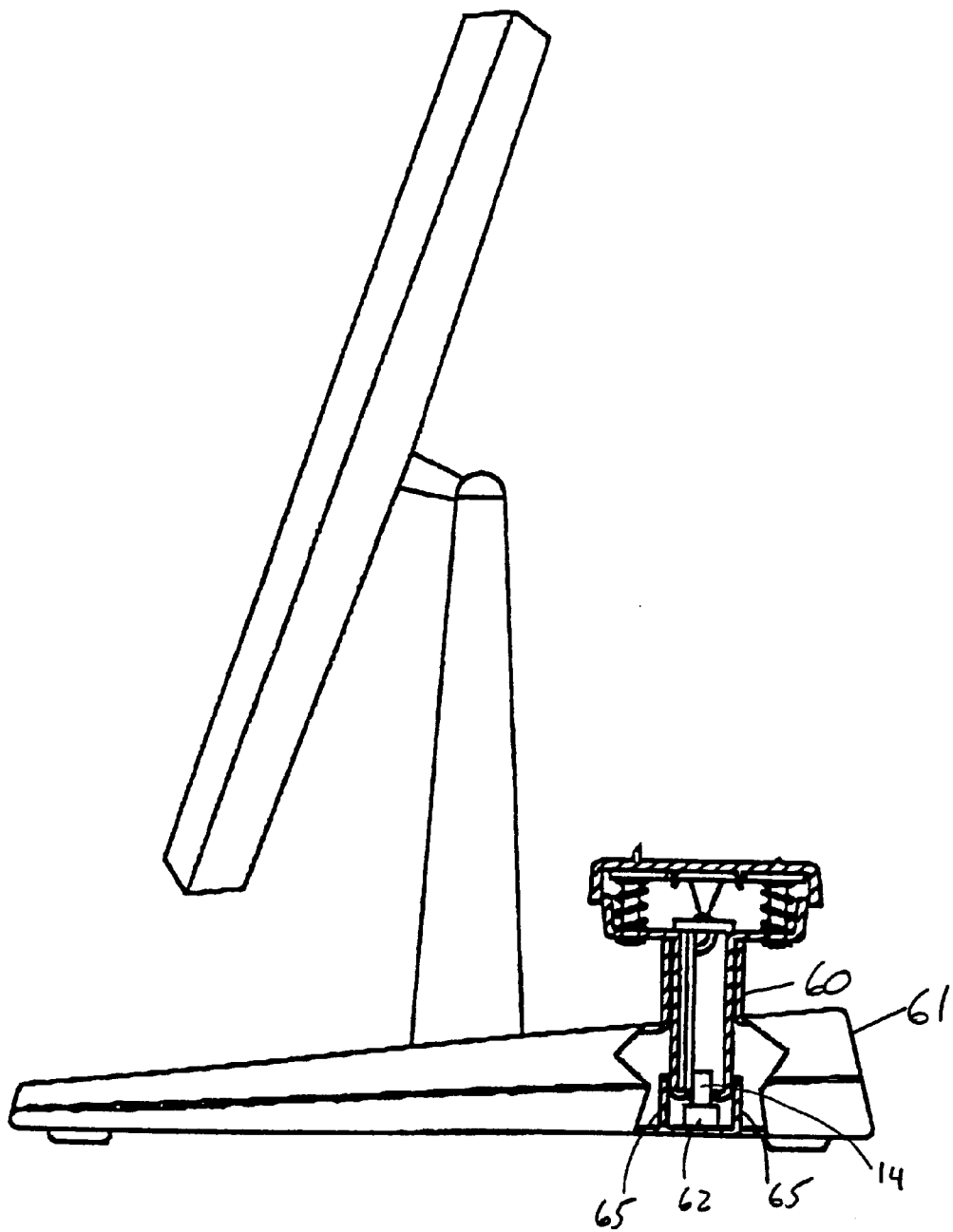
FIG. 6 is a diagram of the first embodiment of the removable scale cartridge of the present invention inserted into a flat-panel display.

FIG. 6 shows the removable scale cartridge of the present invention inserted into a slot 60 formed in a housing 61 of a flat-panel display. The slot may be continuous as in accordance with the other embodiments, or as shown, discontinuous with guides 65 projecting upwardly from a base 66 internal to the housing of the flat-panel display. Formed at the bottom of slot 60 is a complementary connector 62 adapted to mate with connector 14 projecting from the cartridge. While slot 60 is illustratively shown as being formed along a rearward portion of the base of the flat-panel display, those skilled in the art can appreciate that this slot may be formed along any other surface.

Figure 7:
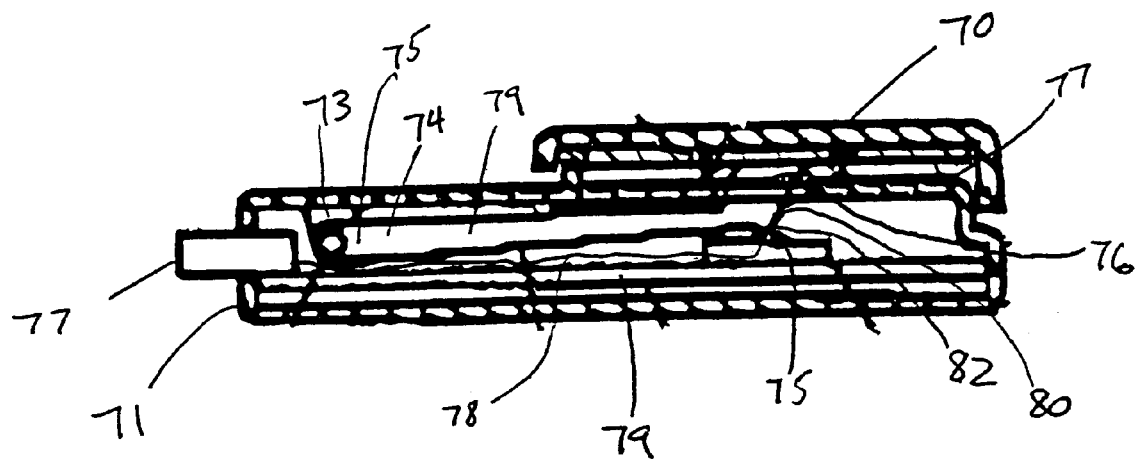
FIG. 7 is a diagram of a second embodiment of the removable electronic scale cartridge of the present invention.

Referring to FIG. 7, a second embodiment of the removable scale cartridge of the present invention includes a platform 70 projecting from a housing 71 that encloses a weighing unit. The weighing unit includes a pivot mount 73, a pivot arm 74, and a force transducer in the form of load cell 75. Pivot mount 73 may be fixed to an interior upper or lower surface of the cartridge housing. Pivot arm 74 has a first end 75 rotatably connected to the pivot mount and a second end 76 in contact with a bottom surface 77 of the platform through a slot in the housing. Preferably, the pivot arm is constructed from two smaller arm portions 79 and 80 which are angularly attached, e.g. at right angles, to form an elbow area. Projecting from the elbow area of arm 74 is a stub 82 located adjacent the load cell, which is fixed to a raised interior surface of the cartridge. If desired, arm 74 may be upwardly biased so that stub 82 does not contact load cell 75 when platform 70 is not being used, or arm 74 may be arranged so that stub 81 and load cell 75 are always in contact.

In operation, an item to be mailed, preferably enclosed within an envelope or the like, is placed on the platform by a user. The weight of the letter applies a force to pivot arm 74, which force is then transmitted to load cell 75 through stub 82. Load cell 75 converts this force into a weight measurement signal which is conveyed to a connector 77 through a signal wire 78 leading from the load cell. As with the first embodiment, the weight measurement signal may be directly output through the connector or a printed circuit board 79 may pre-process the signal into an appropriate connector or signal format. Also, if desired, the removable electronic cartridge of the present invention may be equipped with multiple types of connectors.

FIGS. 8 through 12 show the second embodiment of the removable scale cartridge connected to various pieces of office equipment. Where applicable, like numerals have been used to identify the features of the cartridge depicted in these figures. Also, in each embodiment, it is preferable that the load cell of the present invention receives power from a power source of the office equipment. However, alternative power sources are possible. For example, the scale cartridge may operate using a battery as a primary or back-up power source. The scale cartridge may also be adapted to operate using an AC power adapter, if desired.

Figure 8:
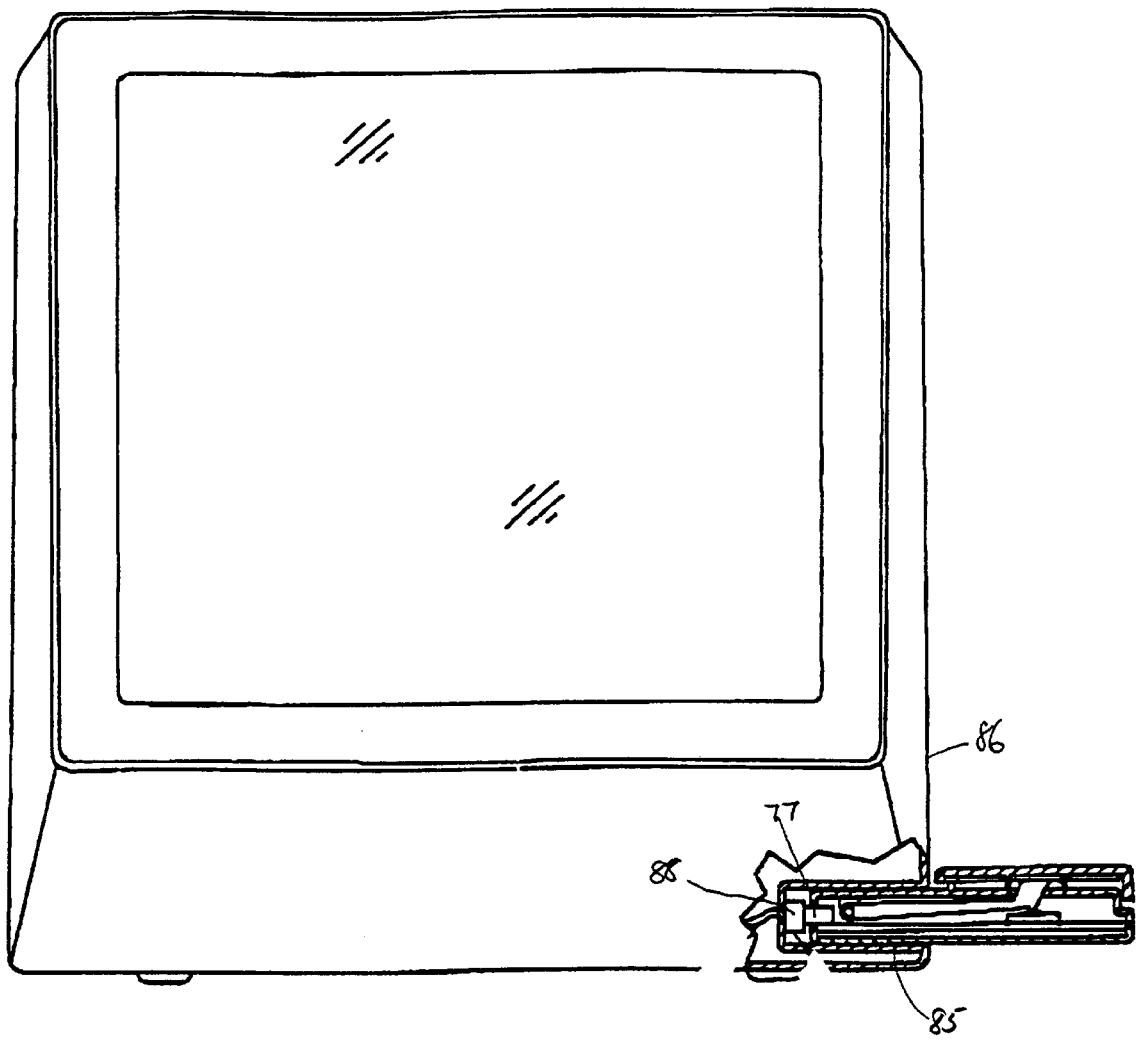
FIG. 8 is a diagram of the second embodiment of the removable scale cartridge of the present invention inserted into a CRT monitor of a personal computer.

FIG. 8 shows the second embodiment of the removable scale cartridge inserted into a slot 85 formed in a housing 86 of a CRT monitor. Formed at the bottom of slot 85 is a complementary connector 88 adapted to mate with connector 77 projecting from the cartridge. While slot 85 is illustratively shown as being formed along a side surface of the CRT monitor, those skilled in the art can appreciate this slot may be formed along any other surface of the monitor. For example, for convenience purposes, the cartridge of the present invention may be inserted into a slot formed along one of the side surfaces of the monitor.

Figure 9:
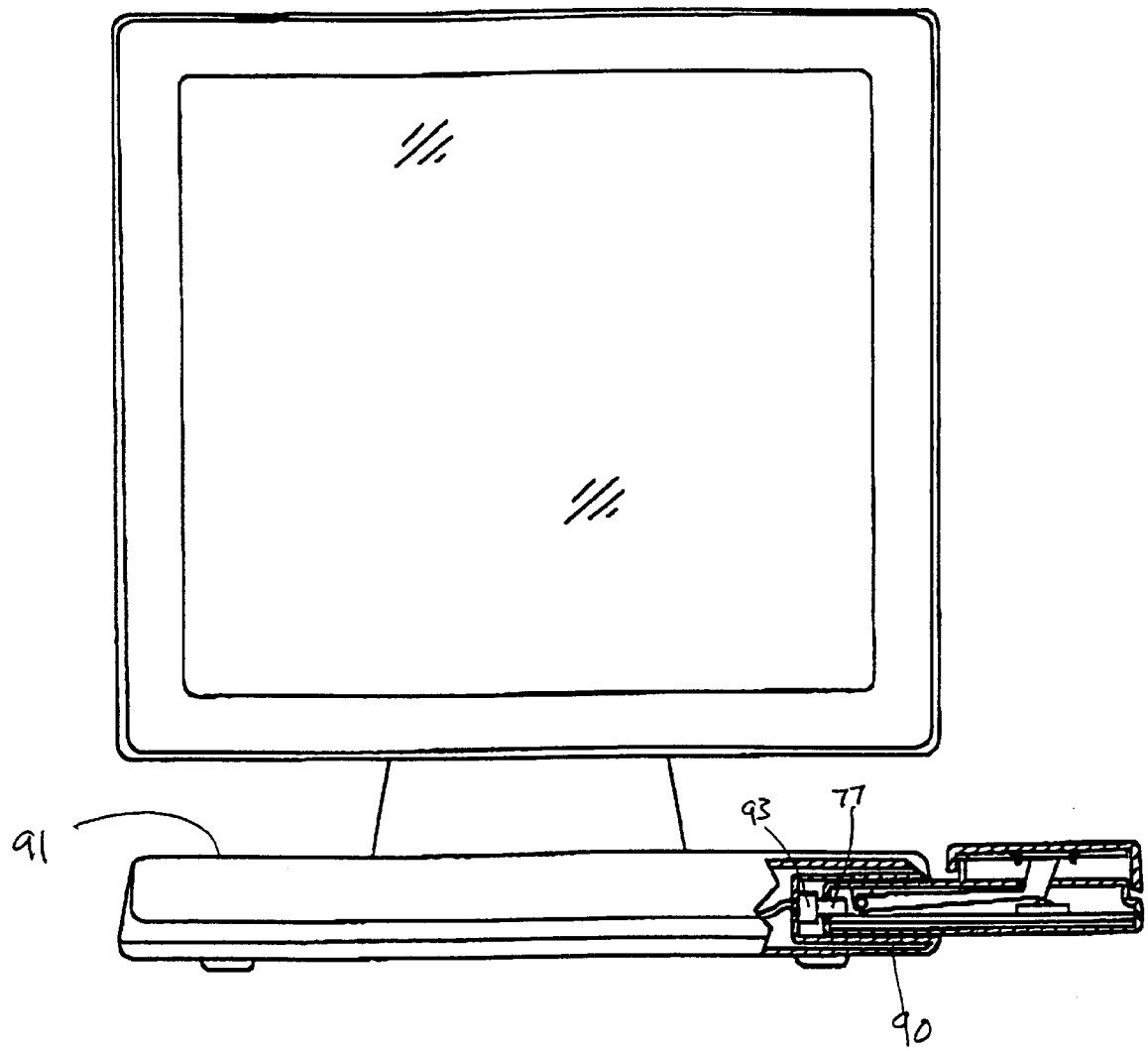
FIG. 9 is a diagram of the second embodiment of the removable scale cartridge of the present invention inserted into a flat-panel display.

FIG. 9 shows the second embodiment of the removable scale cartridge inserted into a slot 90 formed in a housing 91 of a flat-panel display. Formed at the bottom of slot 91 is a complementary connector 93 adapted to mate with connector 77 projecting from the cartridge. While slot 90 is illustratively shown as being formed along one side of a base of the flat-panel display, those skilled in the art can appreciate that this slot may be formed along any other surface.

Figure 10:
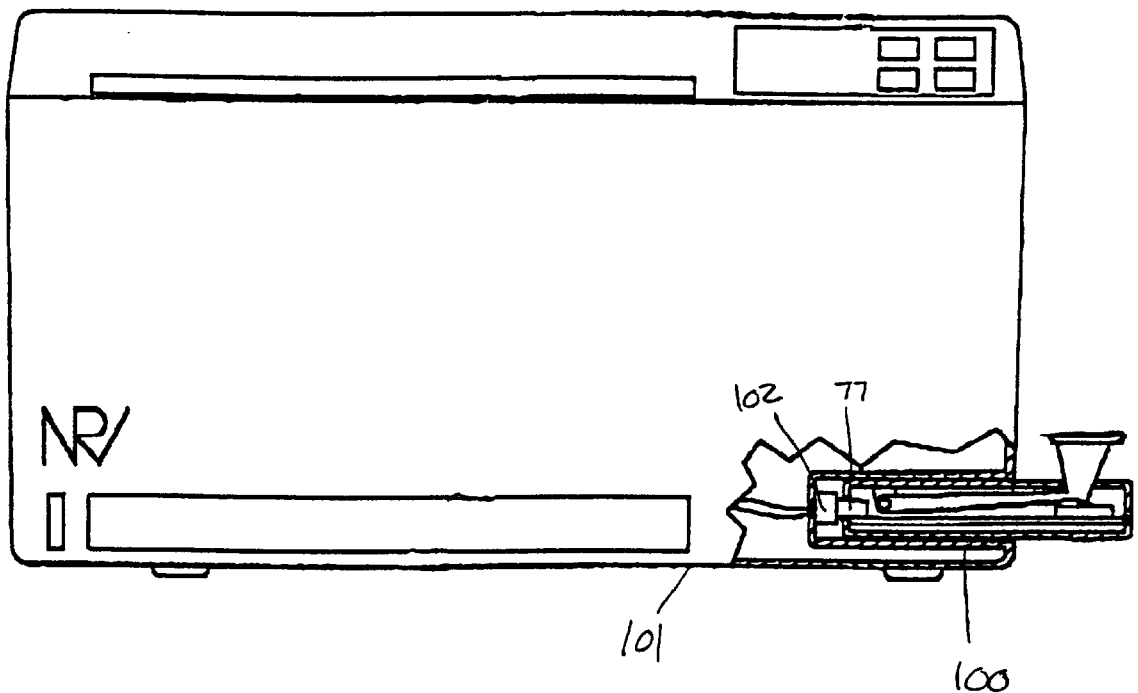
FIG. 10 is a diagram of the second embodiment of the removable scale cartridge of the present invention inserted into a printer.

FIG. 10 shows the second embodiment of the removable scale cartridge inserted into a slot 100 formed in a housing 101 of a printer. Formed at the bottom of slot 100 is a complementary connector 102 adapted to mate with connector 77 projecting from the cartridge. While slot 100 is illustratively shown as being formed along a side surface of the printer, those skilled in the art can appreciate that this slot may be formed along any other printer surface.

Figure 11:
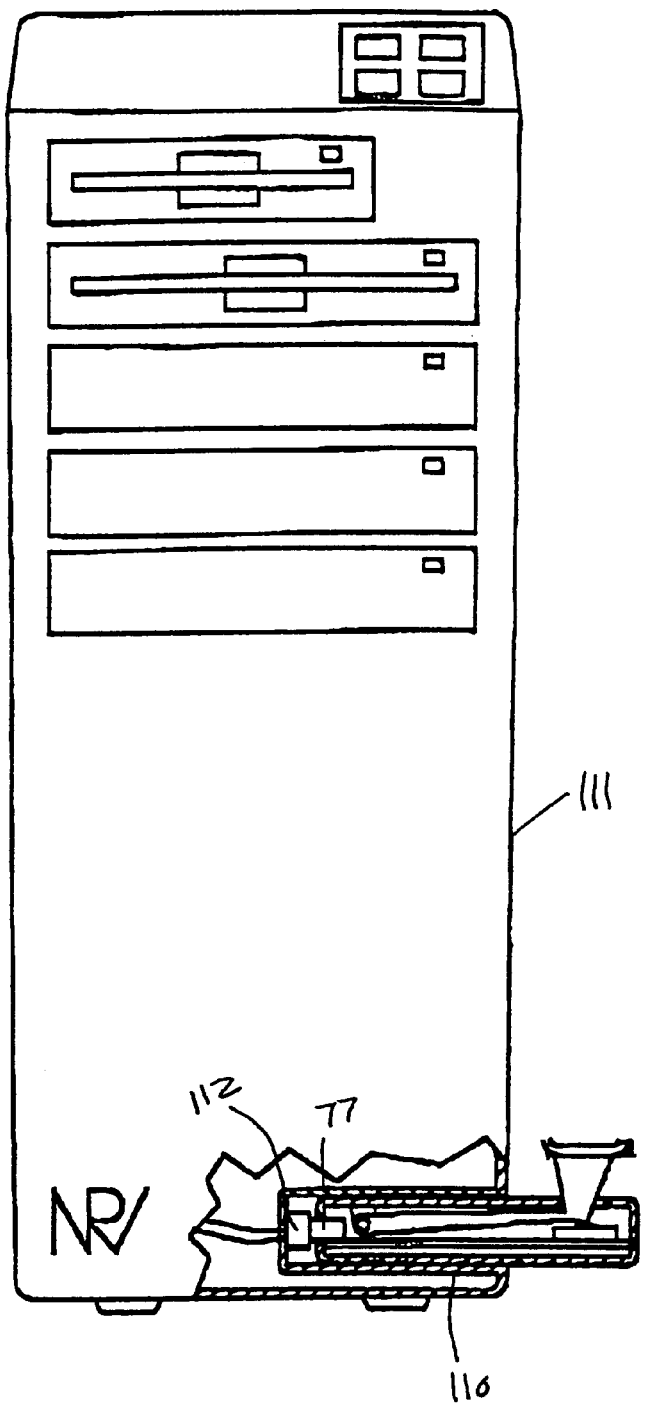
FIG. 11 is a diagram of the second embodiment of the removable scale cartridge of the present invention inserted into a CPU of a personal computer.

FIG. 11 shows the second embodiment of the removable scale cartridge inserted into a slot 110 formed in a housing 111 of a CPU. Formed at the bottom of slot 110 is a complementary connector 112 adapted to mate with connector 85 projecting from the cartridge. While slot 100 is illustratively shown as being formed along a base of the CPU, those skilled in the art can appreciate that this slot may be formed along any other surface. Also, while the CPU unit depicted has a tower configuration, those skilled in the art can appreciate that the scale cartridge of the present invention may be adapted for insertion into the housing of any other type of CPU unit.

Figure 12:
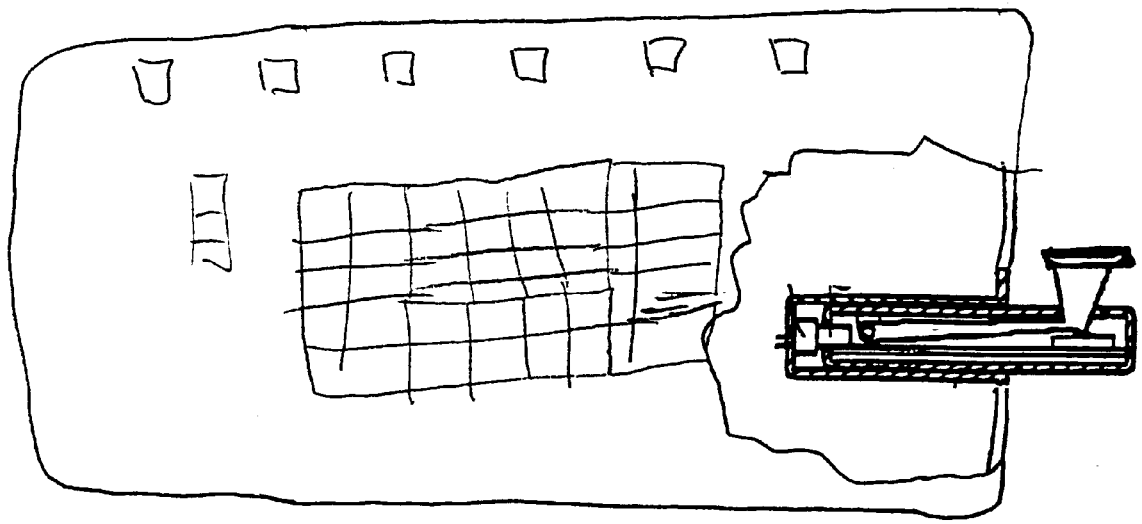
FIG. 12 is a diagram of the second embodiment of the removable scale cartridge of the present invention inserted into a keyboard.

FIG. 12 shows the second embodiment of the removable scale cartridge inserted into a slot 115 formed in a housing 116 of a keyboard. Formed at the bottom of slot 1115 is a complementary connector 1117 adapted to mate with connector 77 projecting from the cartridge. While slot 115 is illustratively shown as being formed along a side surface of the keyboard, those skilled in the art can appreciate that this slot may be formed along any other keyboard surface.

Figure 13:
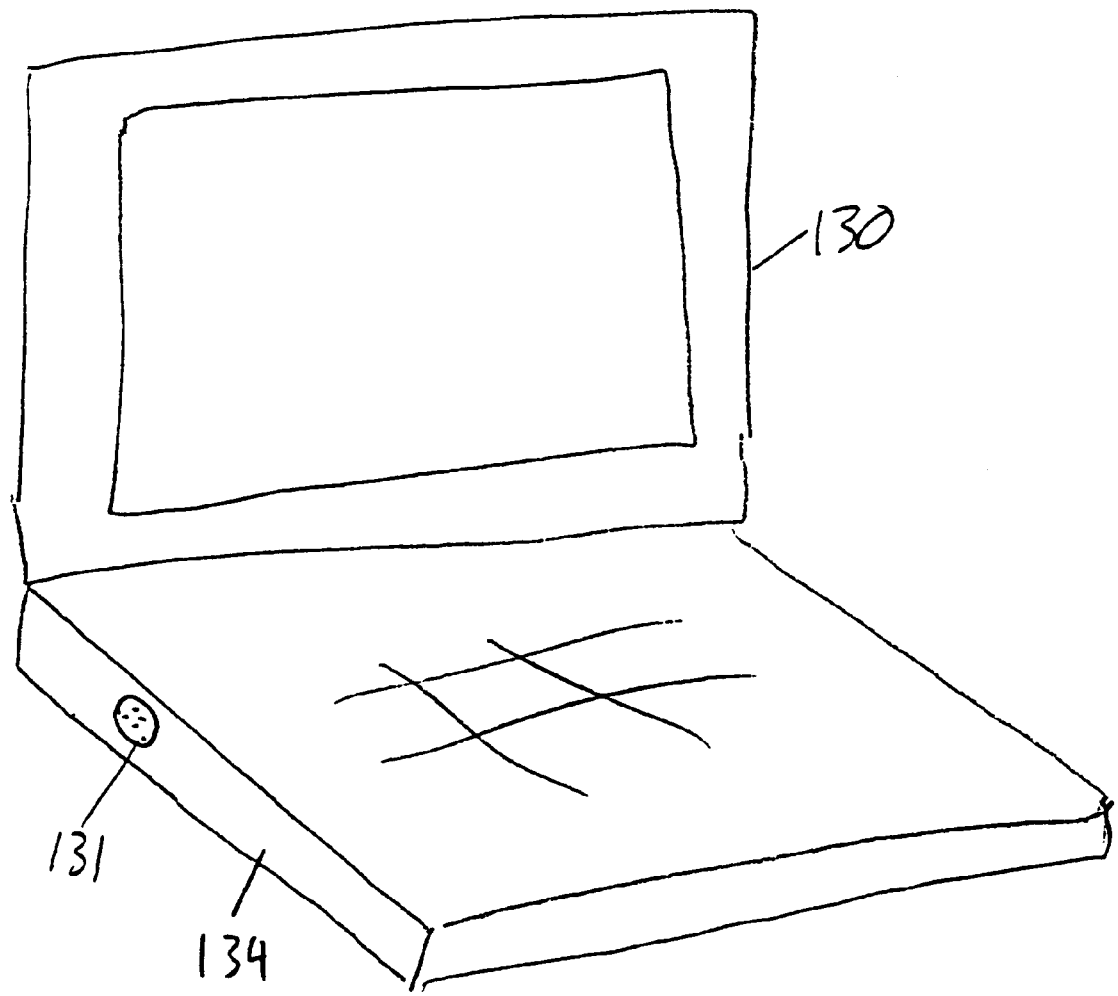
FIG. 13 is a diagram of the removable scale cartridge of the present invention connected to a notebook computer.

FIG. 13 shows a notebook computer 130 having a connector 131 adapted for coupling with the connector of either one of the first and second embodiments of the removable scale cartridge of the present invention. While connector 131 is shown at a side surface of a housing 134 of the computer, those skilled in the art can appreciate that this connector may be located along any other surface.

The removable scale cartridge of the present invention may also be coupled to any one of a variety of portable or hand-held electronic devices including but not limited to personal digital assistants (e.g., the Palm Pilot®) and wireless communications devices, e.g., cellular phones, internet appliances, etc. One such device is illustratively shown in FIG. 14. This device includes a USB port 140 adapted for connection to the removable scale cartridge of the present invention. Preferably, the device is loaded with or able to access an application program for computing postal rates based on weight measurement signals derived from the cartridge of the present invention. A mark bearing the computed rate may then be printed on a printer, also interfaced to the device.

In all the foregoing embodiments, the force required to keep the cartridge fixed to the piece of equipment or portable device may be provided solely by the frictional fit established between the connectors. Removal of the scale cartridge may then be accomplished simply by a user pulling the cartridge from the slot, thereby disconnecting two connectors. Other cartridges with different weight capacities may then be inserted to suit the needs of the user.

For enhanced stability, other measures may be taken. For example, the width of the cartridge housing may selected to provide an additional frictional fit with side walls of each slot. Alternatively, or in addition, the slot and cartridge housing may be equipped with any one of a number of conventional frictional members which, when coupled, secure the cartridge into the slot. A representative sampling of these members include cup-and-ball arrangements as shown in FIGS. 15(a) and 15(b) and any one of a number of known tongue-and-groove arrangements, an illustrative one of which is shown in FIG. 15(c).

Figure 16B:
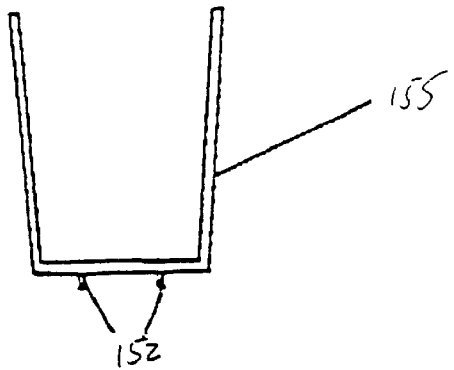
FIGS. 16(b) and 16(c) are diagrams of alternative, detachable holders which detachably connect to the base.
Figure 16C:
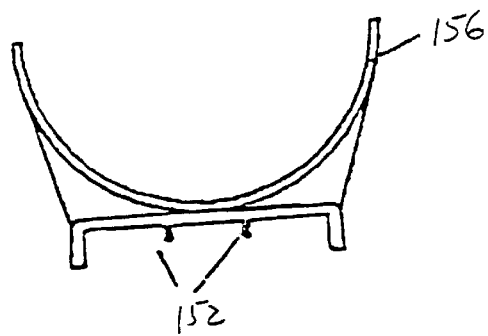
Figure 16A:
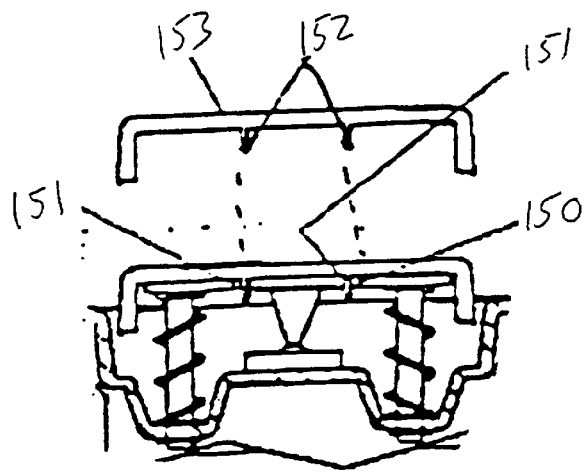
FIG. 16(a) is a diagram showing a base which may replace the platform shown in the first and second embodiments of the removable scale cartridge of the present invention along with the detachable connection of a weigh platform to the base.

A number of optional features may also be included in each of the foregoing embodiments. For example, the platform of the scale cartridge may be removably connected to the weighing unit so that platforms/containers of other shapes and sizes may be used. As shown in FIG. 16(a), the platform of the first and second embodiments may be replaced with abase 150 fixed to the support member(s). The base may include slots 151 for receiving snaps 152 mounted on the underside of a weigh platform 153, shown in FIG. 16(a), or on the underside of a holder two of which are illustratively shown in FIGS. 16(b) and 16(c). The snap arrangement advantageously allows the holders to be removably and interchangeably connected to the scale cartridge. Further, the holders may have varying dimensions suitable for accommodating letters, envelopes, and packages of different or unusual sizes.

The force transducer in each embodiment may be of any conventional type with a suitable weight capacity, e.g., for lighter-weight mail the load cell may have a 5-pound capacity. Those skilled in the art can appreciate, however, that load cells of other capacities may be used. Also, while the force transducer of the invention is specifically described herein as a load cell, those skilled in the art can appreciate that other types of force transducers (e.g., digital or analog) may be used.

In all the embodiments discussed herein, the weight measurement signals output through the cartridge connector flow to a processor for computation of a postal or carrier rate in accordance with the system and method of the present invention.

Figure 17:
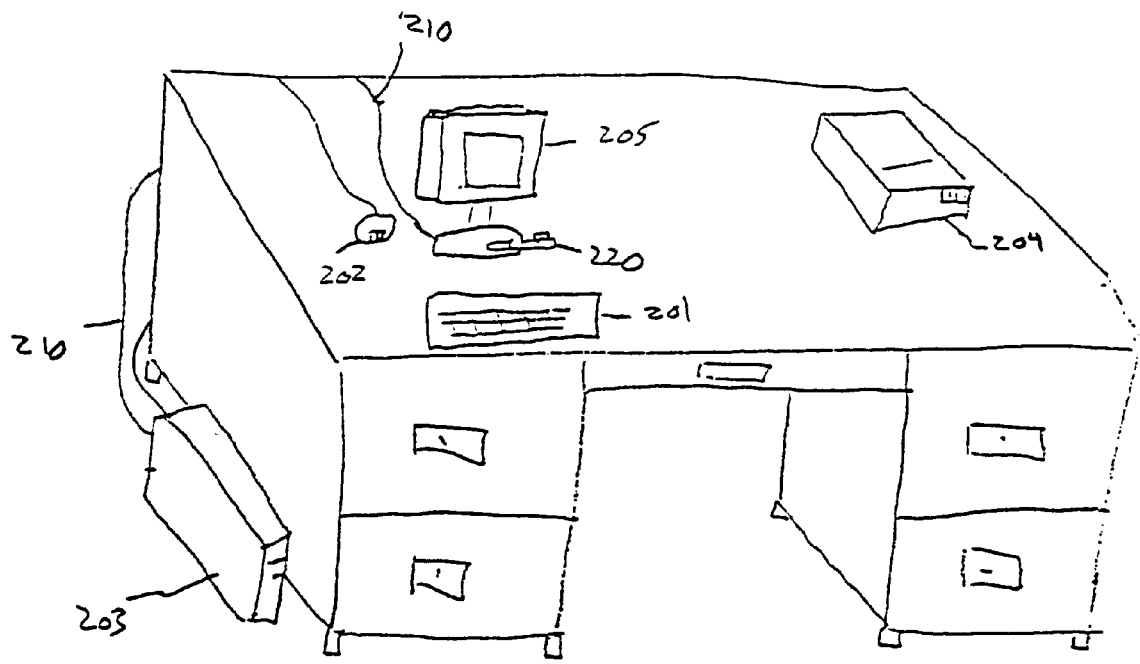
FIG. 17 is a conceptual diagram of a system for computing postal and carrier rates in accordance with the present invention.

Referring to FIG. 17, a first embodiment of a system for computing postal/carrier rates in accordance with the present invention includes a personal computer having a keyboard 201, a mouse 202, a CPU 203, a printer 204, and a display 205 which may be a flat-panel display or a CRT monitor. Advantageously, the electronic scale cartridge of the present invention may be removably connected to any one of the CPU, printer, and display to enhance the degree of integration of the system above all systems conventionally known.

For the sake of illustration, FIG. 17 has been drawn to show the scale cartridge 220 of the present invention connected to the CRT monitor. As such, signal lines 210 leading from the monitor convey weight measurement signals from the scale cartridge to the CPU of the computer, which is running a computer program for converting the signals into a postal carrier rate. Preferably, the program is equipped with or at least is adapted to interface to graphic interface software that will allow a user to perform a variety of functions once the postage has been computed. These functions may include directing a printer to print a postage and/or private carrier rate mark directly onto an envelope or to a label which can be affixed onto the item weighed. Also, if desired, the printer may print address and/or postal bar codes.

Figure 14:
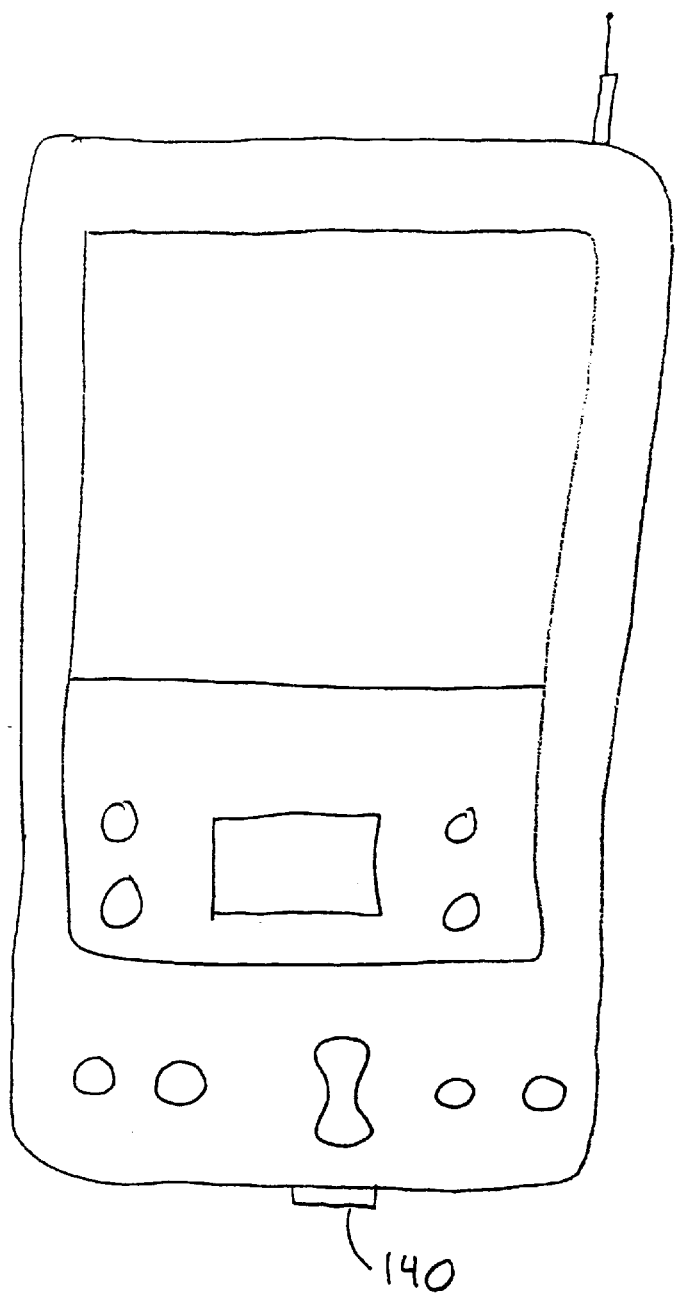
FIG. 14 is a diagram of the removable scale cartridge of the present invention interfaced to an electronic device which, for example, may be a personal digital assistant or wireless electronic device.

A second embodiment of a system for computing postal/carrier rates in accordance with the present invention includes a portable electronic device, illustratively shown as a personal digital assistant, having a connector into which the scale cartridge of the present invention is inserted. Such a system is shown in FIG. 14 and includes a program for either computing a rate based on a weight measurement signal output from the cartridge or merely storing the weight measurement signal for later downloading to a processor, e.g,. the CPU of a personal computer.

The method of the present invention automatically determines postal/private carrier rates for letters, packages, and other parcels weighed in accordance with the system of the present invention. Preferably, the steps of the method are implemented in accordance with the aforementioned computer program. For convenience and efficiency reasons, this program may be designed to be interactive in nature. Further, to achieve compatibility with most personal computer systems in use today, the computer program may be a Windows application program initiated by clicking an icon on a computer screen. Those skilled in the art can appreciate, however, that the computer program may be in a form compatible with any operating system or type of electronic device.

For example, portable and wireless electronic devices are controlled by any one of a variety of operating systems. A representative sampling of these operating systems include the Windows CE® operating system, the LINUX® operating system, the Apple® operating system, and the Palm Pilot® operating system. For convenience of use and widespread appeal, the program for computing postal and carrier rates may be adapted to run in any one of these operating systems. Alternatively, the electronic device to which the scale cartridge of the present invention is attached may receive this program from an application service provider, either wirelessly or through a hard-wired or fiber-optic network connection.

Figure 18:
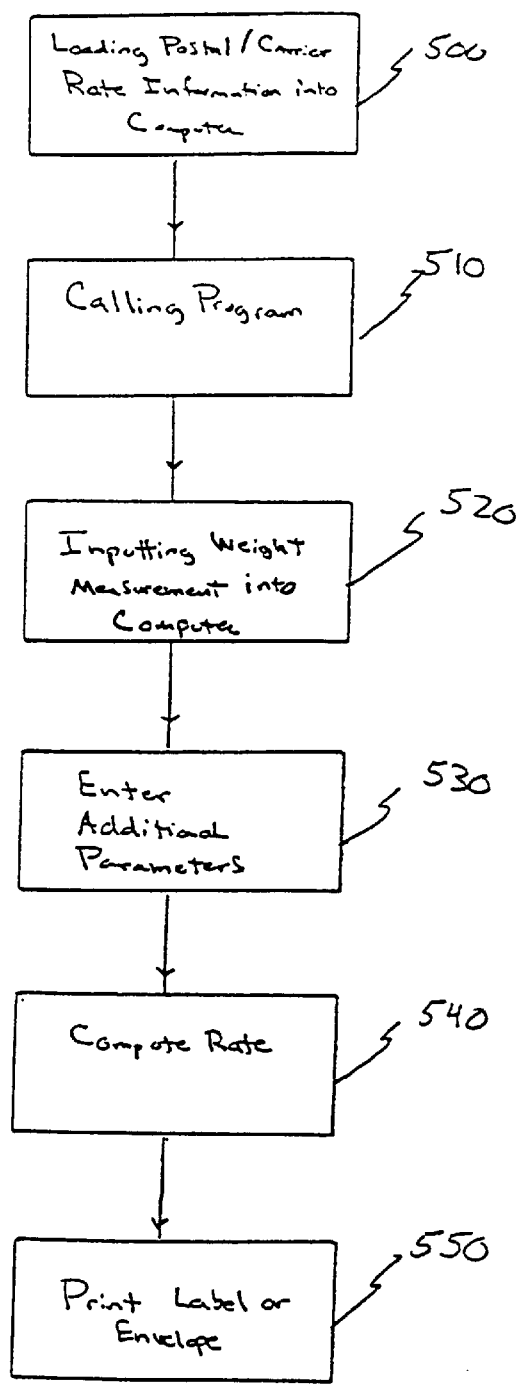
FIG. 18 is a flow diagram showing steps included in the method of the present invention.

FIG. 18 is a flow diagram setting forth steps of the method of the present invention. As shown, a first step includes loading postal/carrier rate information into a personal computer (e.g., desk-top, lap-top, notebook, portable, etc.) or an electronic device (PDA, wireless device, etc.). (Block 500). This rate information may include rates based on weight, class, and zone including domestic and international addresses. Further, the rates may be loaded into the computer from a disk, an Internet web-site, or other such medium or source. Rate information may also be manually entered, if desired.

A second step of the method includes calling the computer program. (Block 510). This can be achieved simply by clicking on an icon on a computer screen. Alternatively, for enhanced convenience and ease of use, the program may be initiated merely by placing a letter onto the platform of the weighing device. Under these circumstances, the weight measurement signals output from the electronic scale may be used to automatically call the computer program, with nothing more required from the user.

A third step of the method includes inputting the weight of an item to be mailed into the computer program. (Block 520). This is performed merely by placing the item on the platform of the electronic scale. The weight measurement signals derived from the scale are received by the program, for example, through a communications port of the personal computer or through an input port of a portable electronic device. The program converts these signals into a weight value which may then be displayed for the user's convenience.

A fourth step of the method includes having the user enter parameters relevant to determining the appropriate rate for the item being mailed. (Step 530). These parameters include those conventionally known, such as class of mail and zone. If desired, the third and fourth steps may be reversed in order, so that the postal parameters are entered by the user before the weight of the item is received by the program.

A fifth step of the method includes computing the postal/carrier rate for the item to be mailed based on the weight and parameters entered during the third and fourth steps. (Block 540). This step may be performed in accordance with any of a variety of known methods for computing the rate.

A sixth step of the method includes directing a printer, label-maker, or the like to print out an envelope or label bearing the computed postage or carrier charge, and/or address and postal bar code information. (Block 550).

As previously noted, the method of the present invention may be interactive in nature. FIGS. 19–23 set forth a series of display screens which may be used to request the user to enter information relevant to the rate calculation. As shown, these screens may include at least the following screens displayed in seriatim.

Figure 19:
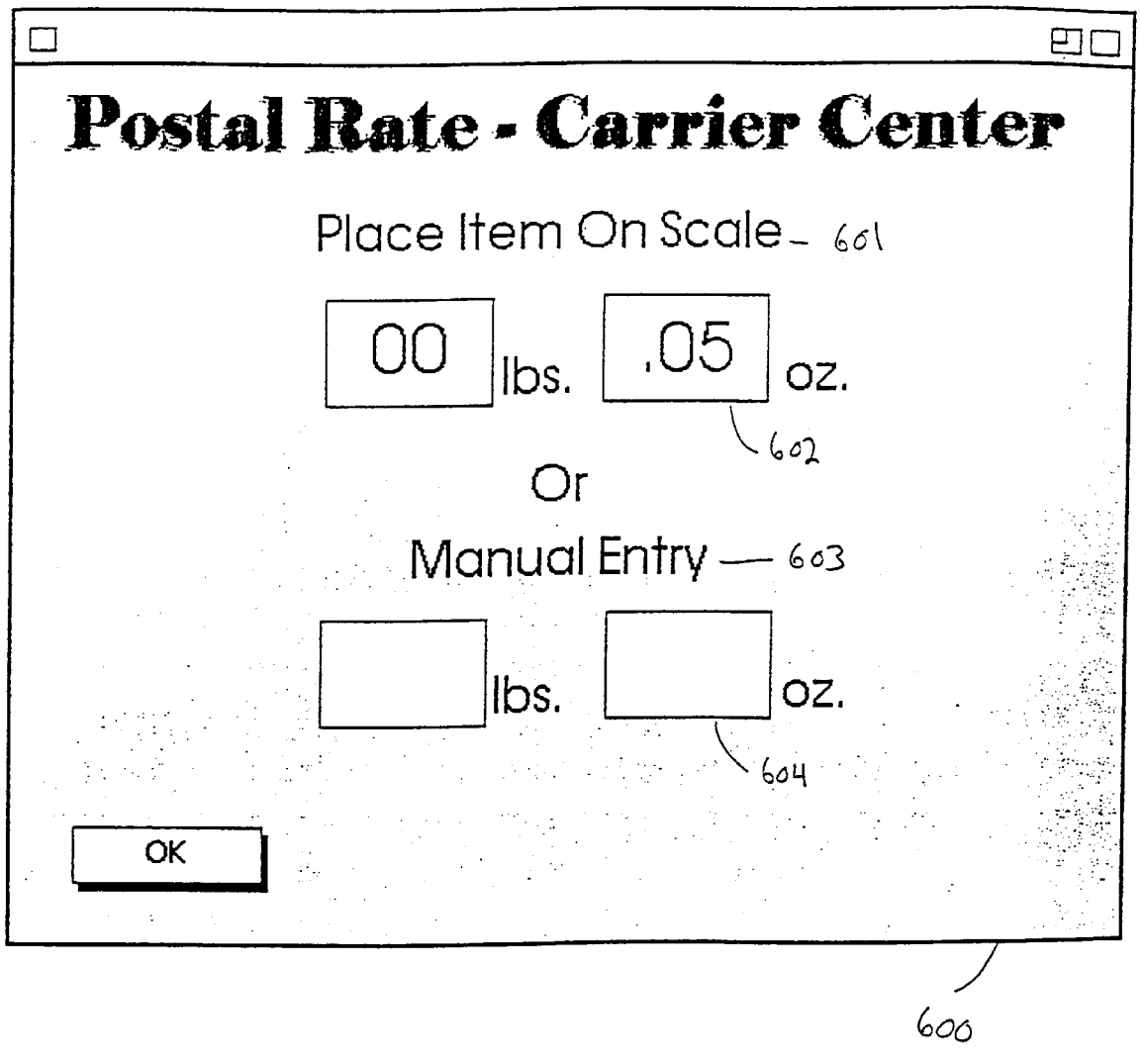
FIGS. 19–23 show a series of display screens which may be used to implement the steps of the method of the present invention.

Referring to FIG. 19, screen 600 includes a message 601 instructing the user to place an item of mail on the electronic scale of the present invention, and a window 602 for automatically displaying the weight of the item in accordance with the method of the present invention. An optional message 603 may be displayed to request the user to manually enter the weight of the item in window 604, if she or he so desires. An "OK" window may then be selected upon display of the weight to cause the next screen to be displayed.

Figure 20:
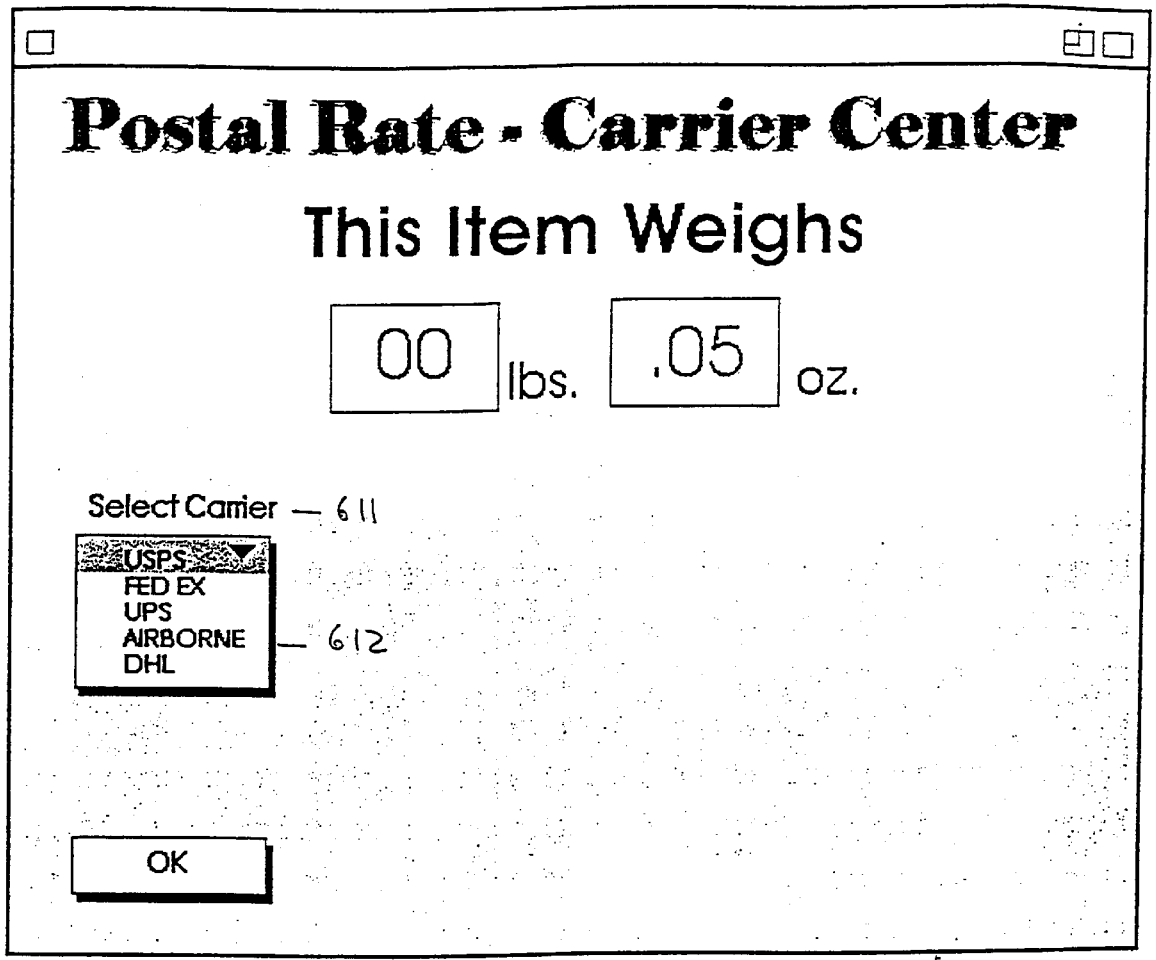

Referring to FIG. 20, screen 610 includes a "Select Carrier" message 611 which requests the user to select one of a plurality of mail carriers, including the U.S. Postal Service or any of a variety of private couriers such as Federal Express, RPS, Emory, AirBorne, and UPS and the like. For convenience, a window 612 is provided beneath message 611 to provide a drop-down menu of the mail carrier options when window 612 is actuated.

Figure 21:
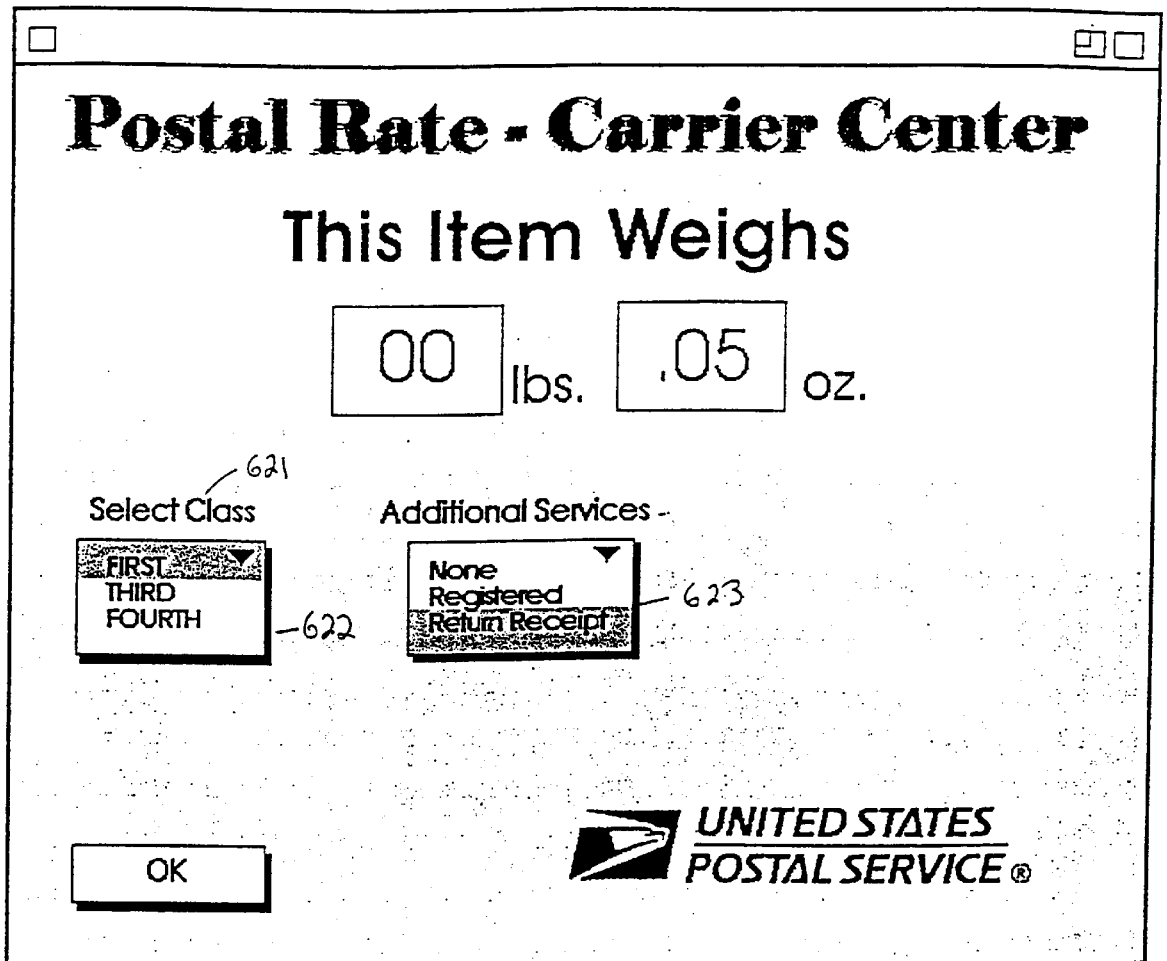

Referring to FIG. 21, screen 620 includes a "Select Class" message 621 for requesting the user to designate the class of mail to be used from a menu 622. An "Additional Services" window 623 may also be provided, if desired. When all information has been entered in this screen, the "OK" window may be designated to cause the next screen to be displayed.

Figure 22:
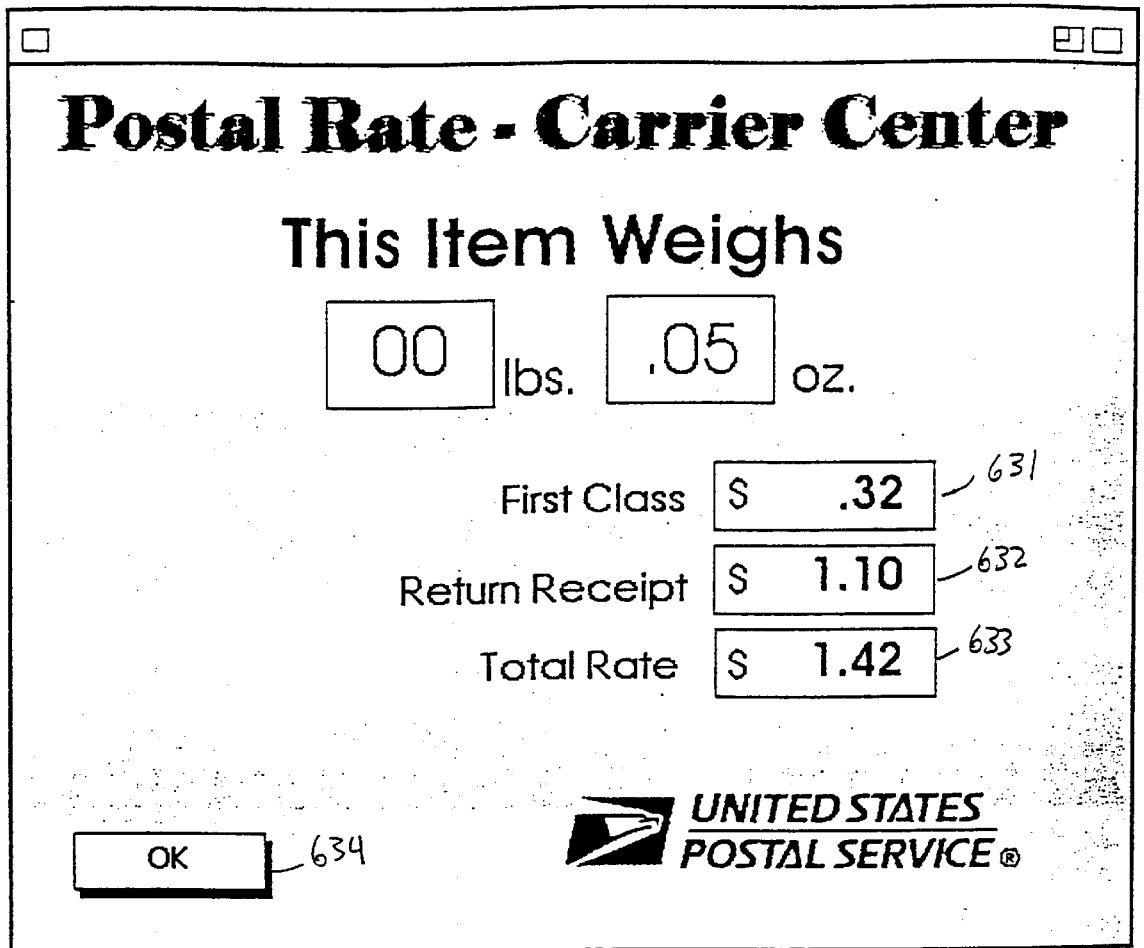

Referring to FIG. 22, when all of the necessary parameters have been entered, a screen 630 is displayed showing the rate corresponding to the item to be mailed. This rate may include a "First Class" rate in window 631, a "Return Receipt" window 632, and a "Total Rate" in window 633. An "OK" window 634 may then be selected to cause a label or envelope bearing a rate mark and/or address and postal bar code information to be printed.

Figure 23:
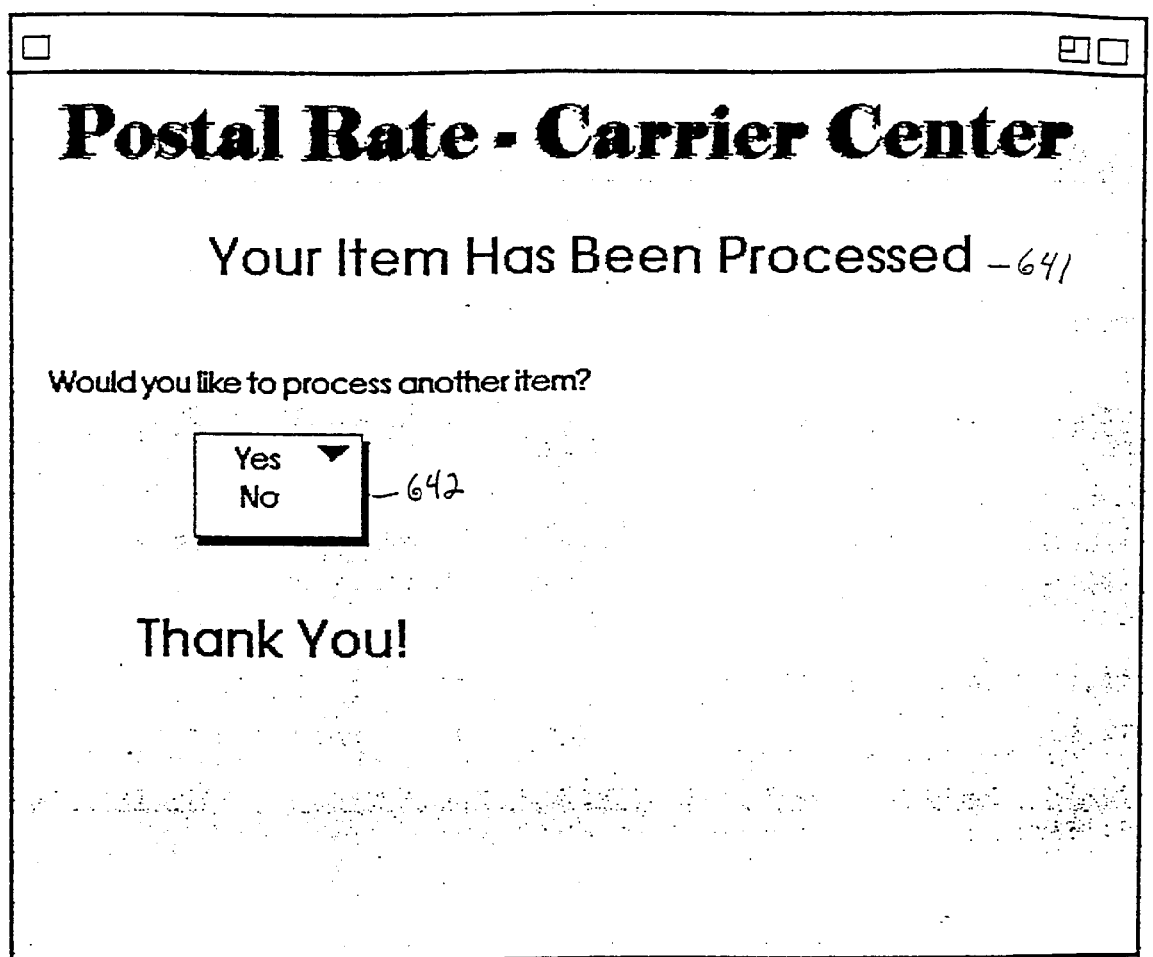

Referring to FIG. 23, when the rate mark has been generated, a confirmation screen 640 is displayed along with a message 641 informing the user that the rate information has been processed. A window 642 is then gives the user an option to compute postage for additional items to be mailed or shipped.

Figure 24:
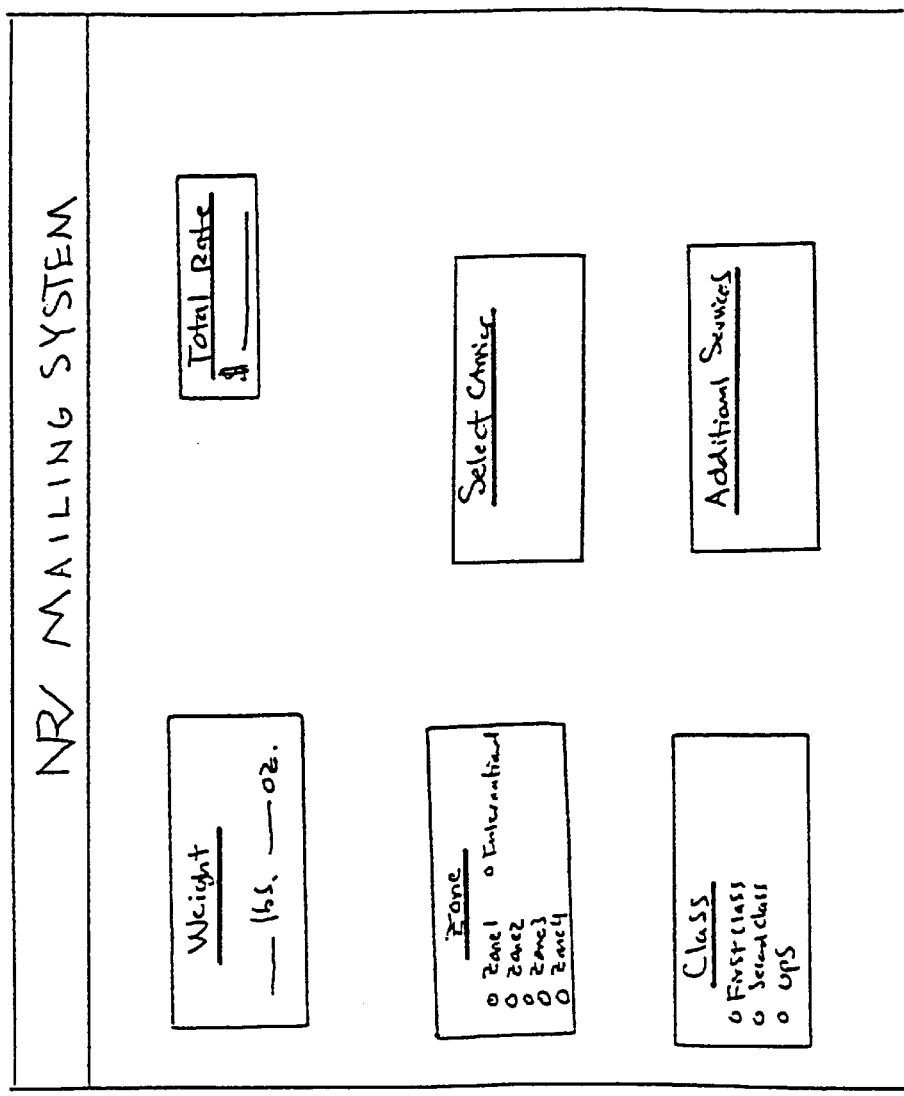
FIG. 24 shows a comprehensive display screen which may be used to implement the steps of the method of the present invention.

Optionally, a single, comprehensive display screen may be used in accordance with the method of the present invention, such as the one shown in FIG. 24.

Figure 25:
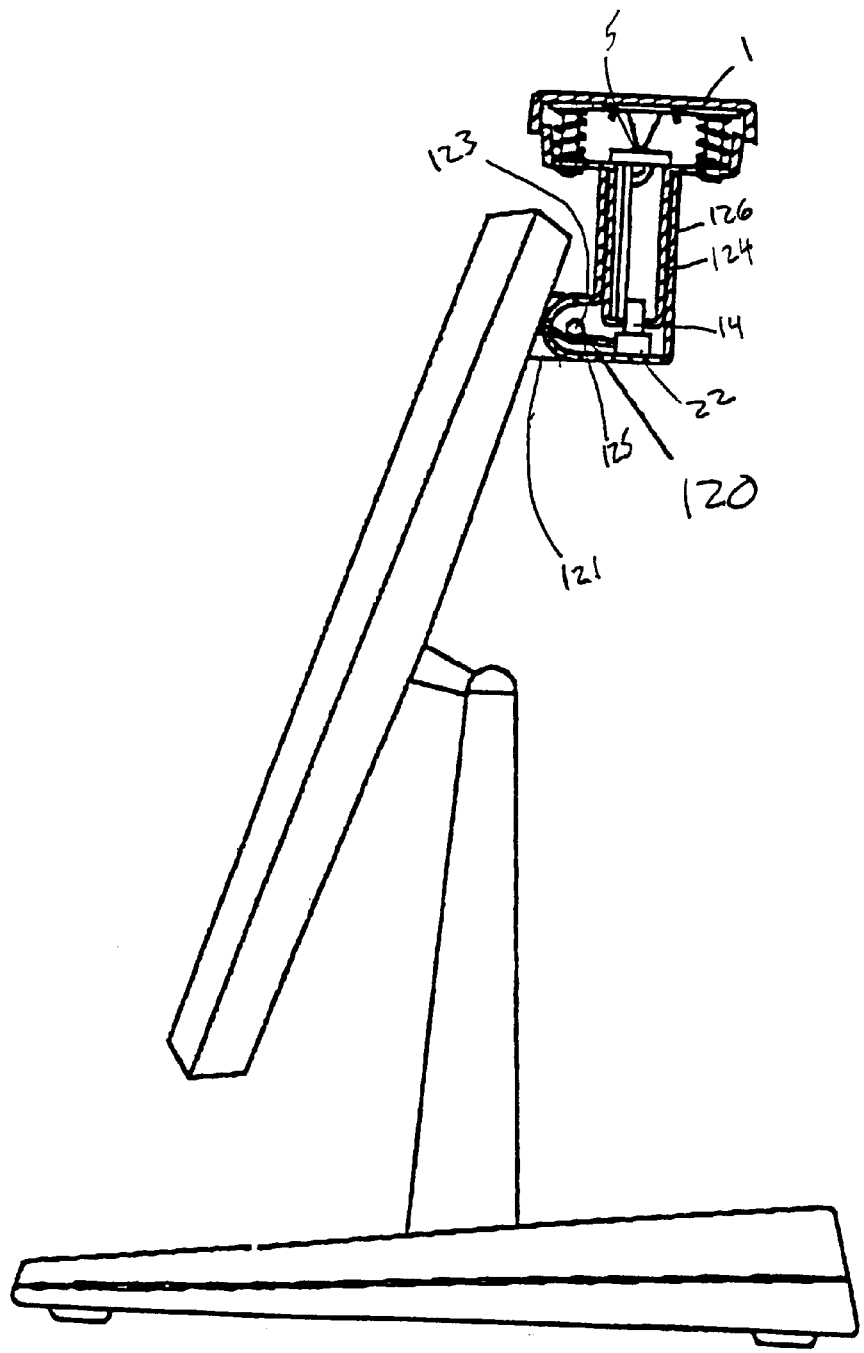
FIG. 25 is a diagram of another weighing arrangement of the present invention equipped wherein an electronic scale is inserted into a sheath attached to a piece of equipment.

FIG. 25 is a diagram of a weighing arrangement attached to a piece of equipment in accordance with the present invention. The weighing arrangement includes a sheath 126 having an extension portion 120 which is connected to a second extension portion 121 projecting from the piece of equipment. Extension portions 120 and 121 are pivotally connected by a pin 123 which is peferably removable. Pin 123 advantageously allows a user to rotate the scale into a level weighing position.

The sheath has a connector 22 which is attached to a wire 125 that extends into the piece of equipment and which carries weight signals that reach a processor executing a postal or private carrier rate computing program. Instead of using the wire, the weight signals from the scale may be communicated to the processor wirelessly, for example, by infrared or RF signals.

Further, the sheath is sized to accommodate any embodiment of the scale cartridge of the present invention previously described herein. For illustrative purposes only, a configuration of the first embodiment is shown. This scale cartridge includes a housing 124, a platform 1 for supporting an item of mail, a weighing unit mounted at least partially within the housing and including a force transducer 5 which outputs a weight signal corresponding to a weight of the mail item through a connector 14 which is coupled to connector 22 in the sheath. In FIG. 25, the piece of equipment is illustratively shown as a flat-panel display; however, those skilled in the art can appreciate that the invention may be attached to any other type of equipment.

Figure 26A:
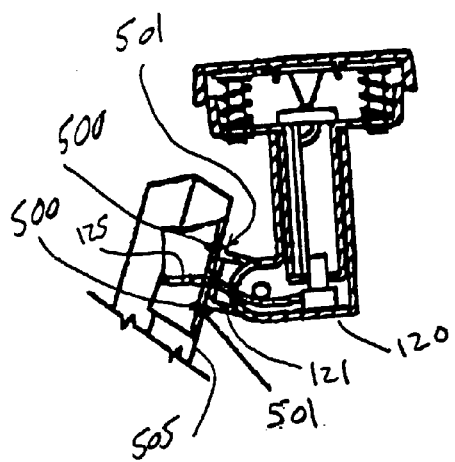
FIG. 26(a)–(b) are diagrams of alternative weighing arrangements of the present invention wherein an electronic scale is inserted into a sheath attached to a piece of equipment.

FIGS. 26(a) and (b) show additional embodiments of the weighing arrangement of the present invention, each of which are removably attached to the piece of equipment by a fastener. The FIG. 26(a) embodiment uses snap members 500 as fasteners. The snap members are formed on extension portion 121 and are adapted to mount within recesses 501 formed in the piece of equipment. If desired, extension portion 502 may be pivotally connected to extension portion 120 by a pin to allow a user to pivot the scale into an appropriate weighing position in spite of the inclined surface 505 of the piece of equipment to which the scale is attached. Instead of a wire, weight signals from the scale cartridge may be communicated to the processor wirelessly, for example, by infrared or RF signals.

Figure 26B:
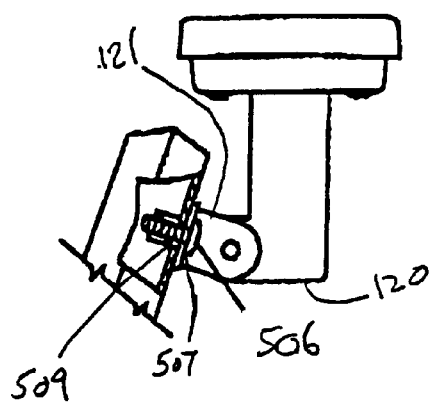

The FIG. 26(b) embodiment uses a screw 506 as the fastener. The screw may pass through a hole 507 in the sheath and into a hole 509 in the equipment housing. If desired, the sheath may include an extension portion 121 which is pivotally attached the scale housing via extension portion 120, however those skilled in the art can appreciate that a non-pivotal attachment of the sheath may be made in this and all other embodiments. As those skilled in the art can appreciate, connecting elements similar to screw 506 may be used, a non-exhaustive list of which include rivets, nails, pins, bolts, winged nuts, and the like.

Figure 27:
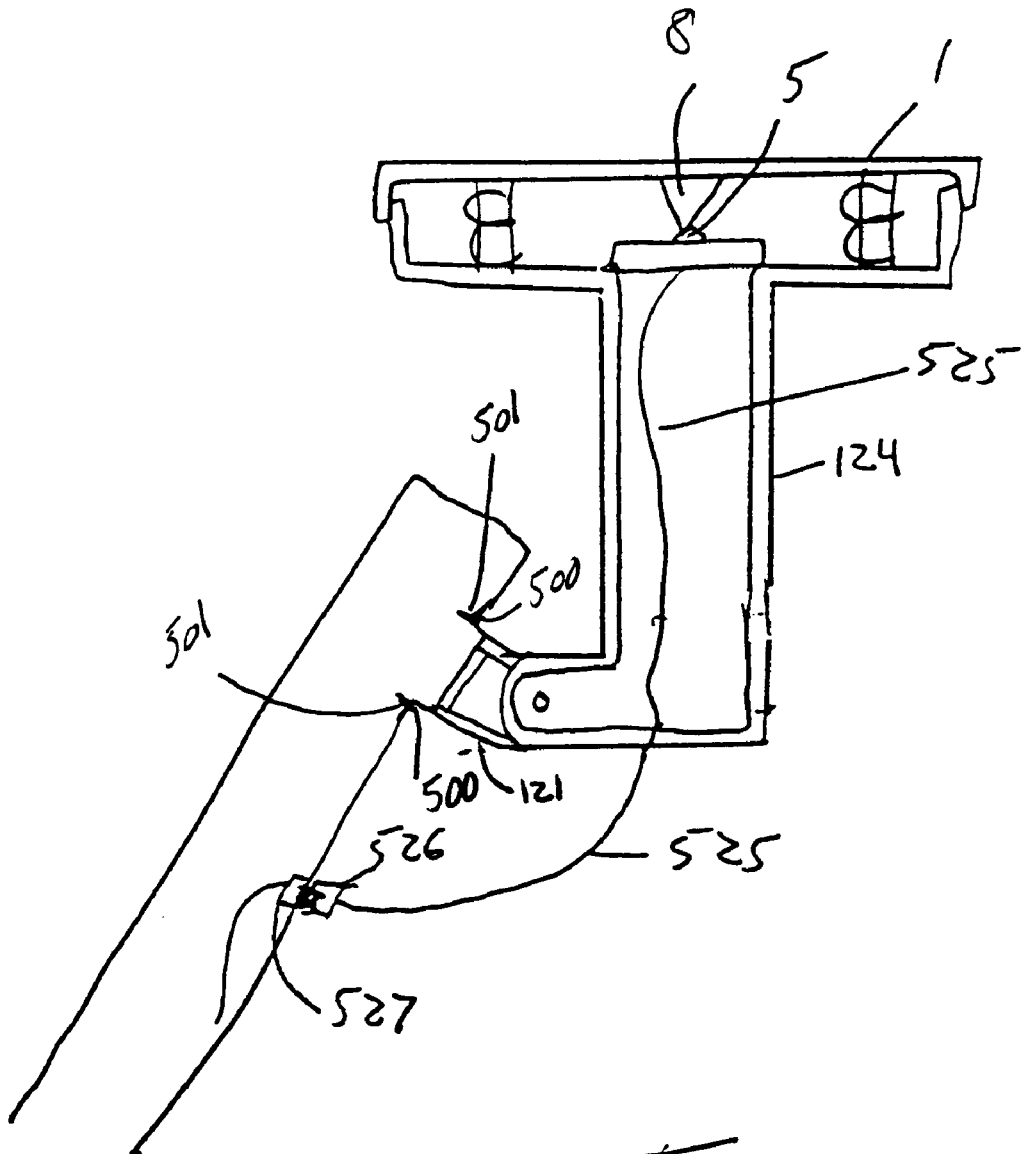
FIG. 27 is a diagram of an electronic scale cartridge of the present invention modified for direct removable and pivotal attachment to a piece of equipment.

FIG. 27 is a diagram of an electronic scale attached to a piece of equipment in accordance with the present invention. The electronic scale may be any embodiment of the scale cartridge modified as indicated below. For illustrative purposes only, a configuration of the first embodiment is shown. As shown, the scale cartridge includes a housing 124, a platform 1 for supporting an item of mail, a weighing unit mounted at least partially within the housing and including a force transducer 5 which outputs a weight signal corresponding to a weight of the mail item, and a fastener which fastens the housing of the scale to a piece of equipment. The piece of equipment is illustratively shown as a flat-panel display; however, those skilled in the art can appreciate that the invention may be attached to any other type of equipment. In FIG. 27, the load cell 5 is connected to a wire 525 which projects out of the cartridge housing and terminates in a connector 526. This connector is adapted for insertion into a matable connector 527 formed along a surface of the equipment housing. A wire 528 then carries the weight signals to a processor for a postal/private rate computation.

FIG. 28(a)–(h) show alternative embodiments of the electronic scale of the present invention. Each of these embodiments has a signal wire 525 which extends outside of the scale housing as previously described. This wire, however, is not shown for purposes of clarity. Each of the embodiments of FIG. 28(a)–(d) differ in the fastener used.

Figure 28A:
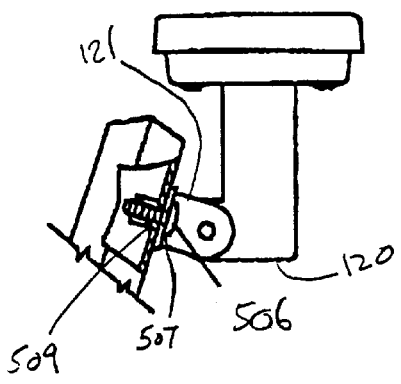
FIGS. 28(a)–(g) are diagrams of electronic scales of the present invention modified for direct removable and pivotal attachment to a piece of equipment, with the embodiment of FIG. 28(g) adapted for wireless transmission of weight signals.

The FIG. 28(a) embodiment uses snaps similar to those shown in FIG. 26(a) as the fastener. This embodiment is similar to the FIG. 26(a) embodiment except there is no sheath, the scale is directly attached to the piece of equipment by the snaps, and wire 525 passes into a jack in the equipment housing. If desired the snaps may be formed on an extension portion 121 which is pivotally mounted to the scale housing. This pivotal attachment allows the scale to be adjusted by a user.

Figure 28B:
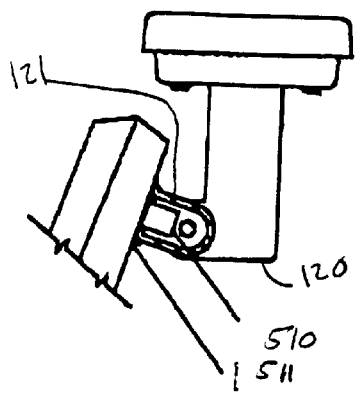

The FIG. 28(b) embodiment uses a screw or similar type of attachment for connecting the scale to the piece of equipment. This embodiment is similar to the FIG. 26(b) embodiment except there is no sheath, the scale is directly attached to the piece of equipment by the snaps, and wire 525 passes into a jack in the equipment housing. If desired the screw holes may be formed on an extension portion 121 which is pivotally mounted to the scale housing. This pivotal attachment allows the scale to be adjusted by a user.

Figure 28C:
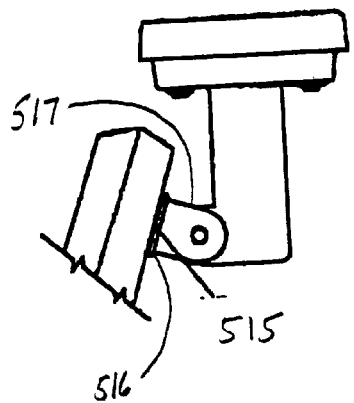

The FIG. 28(c) embodiment uses a magnet 510 and a metal plate 511 as the fastener. Magnet 105 may be mounted on the scale housing and plate 511 may be attached by conventional means to the equipment housing. The power of the magnet is selected to create an attractive force between the magnet and plate sufficient to allow mail items to be weighed. Preferably, the magnet power is selected to be proportional to the weight capacity of the scale. If desired, magnet 510 may be held at a distal end of an extension portion 121, which itself is pivotally mounted to extension portion 120 of the scale housing.

Figure 28D:
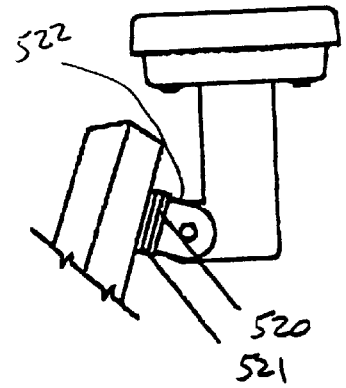

The FIG. 28(d) embodiment uses an adhesive material 515 to mount the scale housing to the piece of equipment The adhesive may be any type conventionally known and preferably is selected to at least be commensurate with the weight capacity of the scale. If desired, the adhesive material may be applied to a flat member 516 formed at the distal end of an extension portion 517, which itself may be pivotally mounted to the scale housing.

Figure 28E:
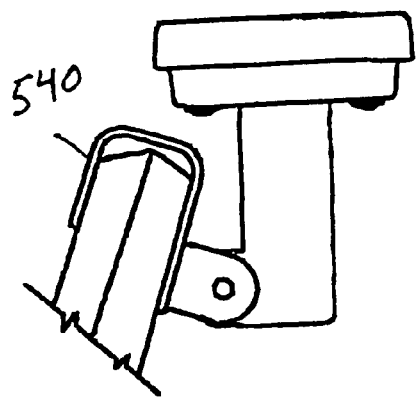

The FIG. 28(e) embodiment uses velcro to mount the scale onto the piece of equipment. The velcro mounting includes a velcro hook pad 520 and a velcro loop pad 521 which are mounted on to the scale housing and equipment, respectively. If desired, pad 520 may be mounted on the equipment and pad 521 o n the scale. The pad attached to the scale may be formed at the distal end of an extension member 522 of the scale housing.

Figure 28F:
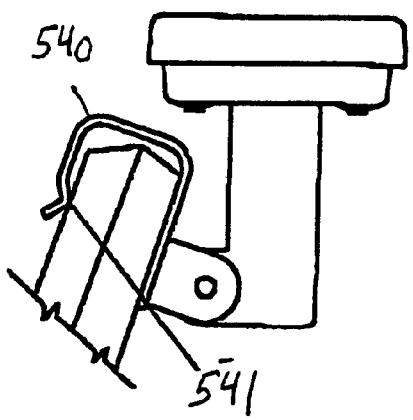

The FIG. 28(f) embodiment uses a clip 540 as the fastener. Clip 540 may be pivotally mounted to the scale housing in a manner similar to the other embodiments.

Figure 28G:
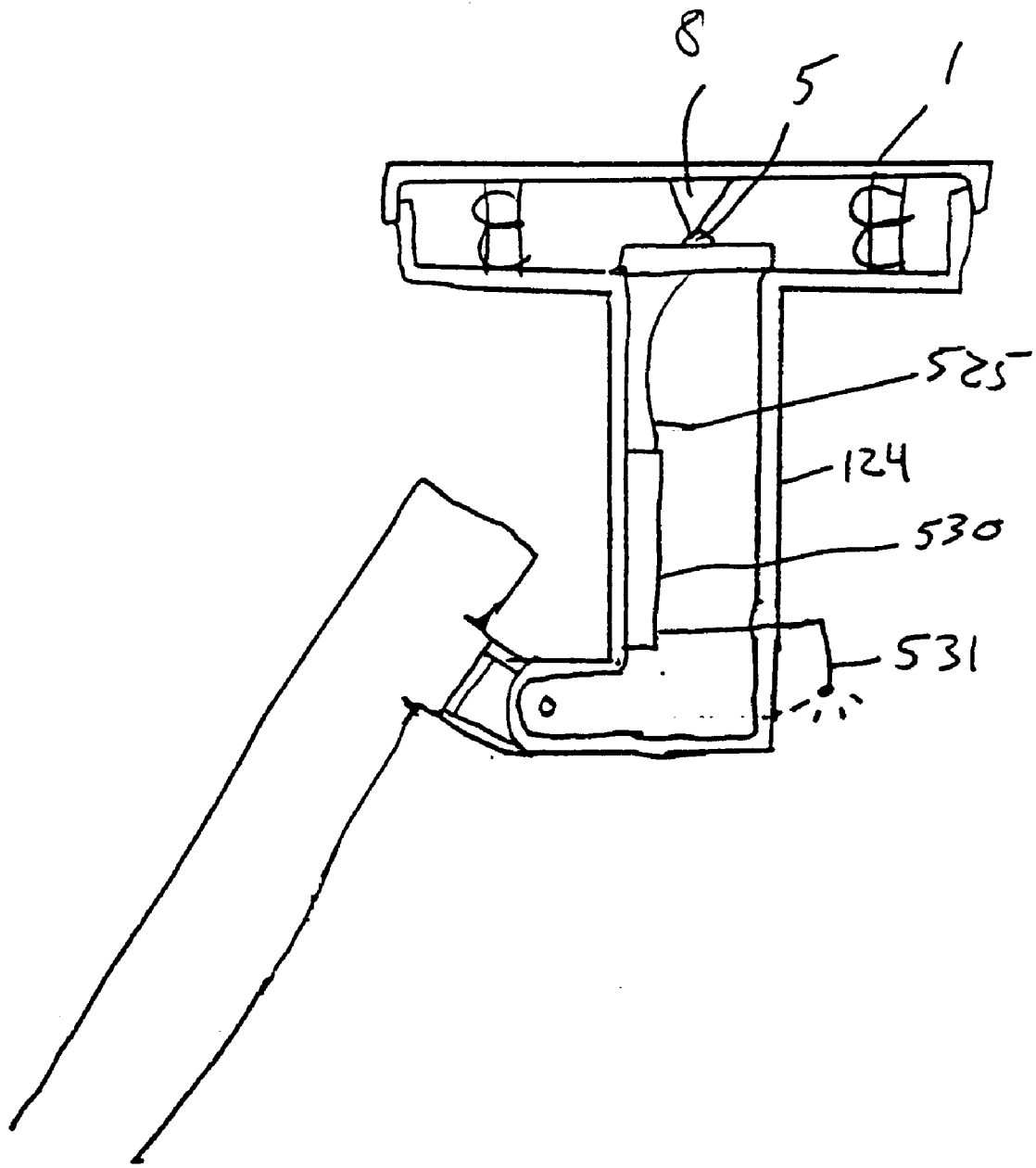

The FIG. 28(g) embodiment is similar to the FIG. 28(f) embodiment except that clip 540 has a spring-biased portion 541 for gripping the piece of equipment.

The FIG. 28(h) embodiment shows an embodiment of the electronic scale of the present invention which is similar to the embodiment of FIG. 27 except that wire 525 is connected to a printed circuit board 530 mounted interior to the scale housing. Printed circuit board 530 contains conventionally known circuits for wirelessly transmitting weigh signals from load cell 105 from an antenna 531 to a receiver (not shown) connected to the processor which computes postal/private carrier rates. While the embodiment of FIG. 28(f) shows a scale similar to the one shown in FIG. 1(a), those skilled in the art can appreciate that any of the embodiments of the scale of the present invention may be adapted for connection to a piece of equipment and for wireless transmission of weight signals. This is particularly true for the scales shown in FIGS. 28(a)–(e), any of which may be modified to replace connector 526 with the wireless configuration shown in FIG. 28(f). While RF transmission is specifically shown in FIG. 28(f), those skilled in the art can appreciate that the invention may transmit weight signals according to other wireless technologies including infrared.

Figure 29:
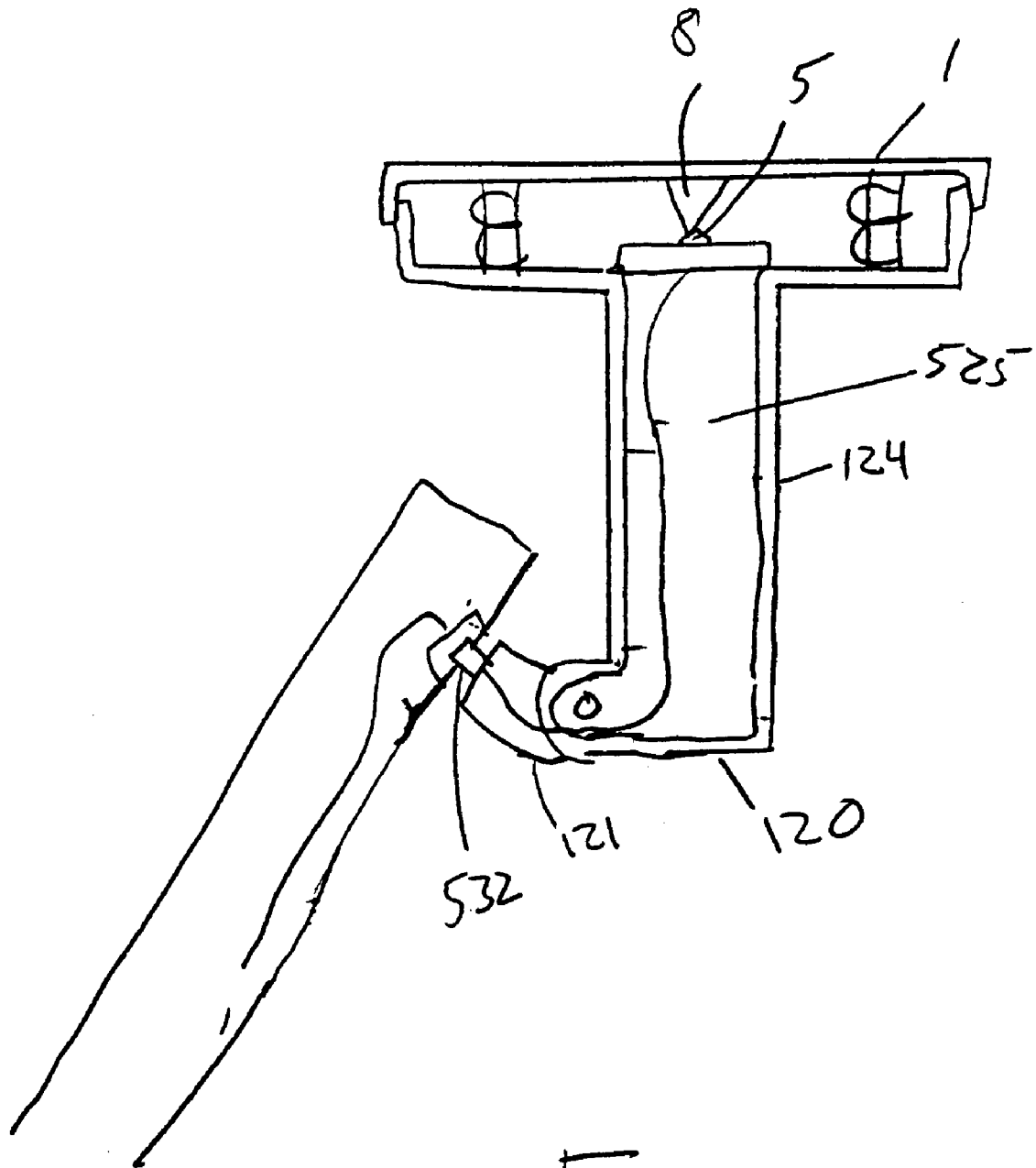
FIG. 29 is a diagram of another electronic scale cartridge in accordance with the present invention.

FIG. 29 is a diagram of another electronic scale cartridge of the present invention. In this scale cartridge, signal wire 525 is connected to a connector 532 accessible from the housing of the scale cartridge. Preferably, the connector is attached to an extension portion 121 which is pivotally attached to an extension portion 120 of the housing.

Figure 30:
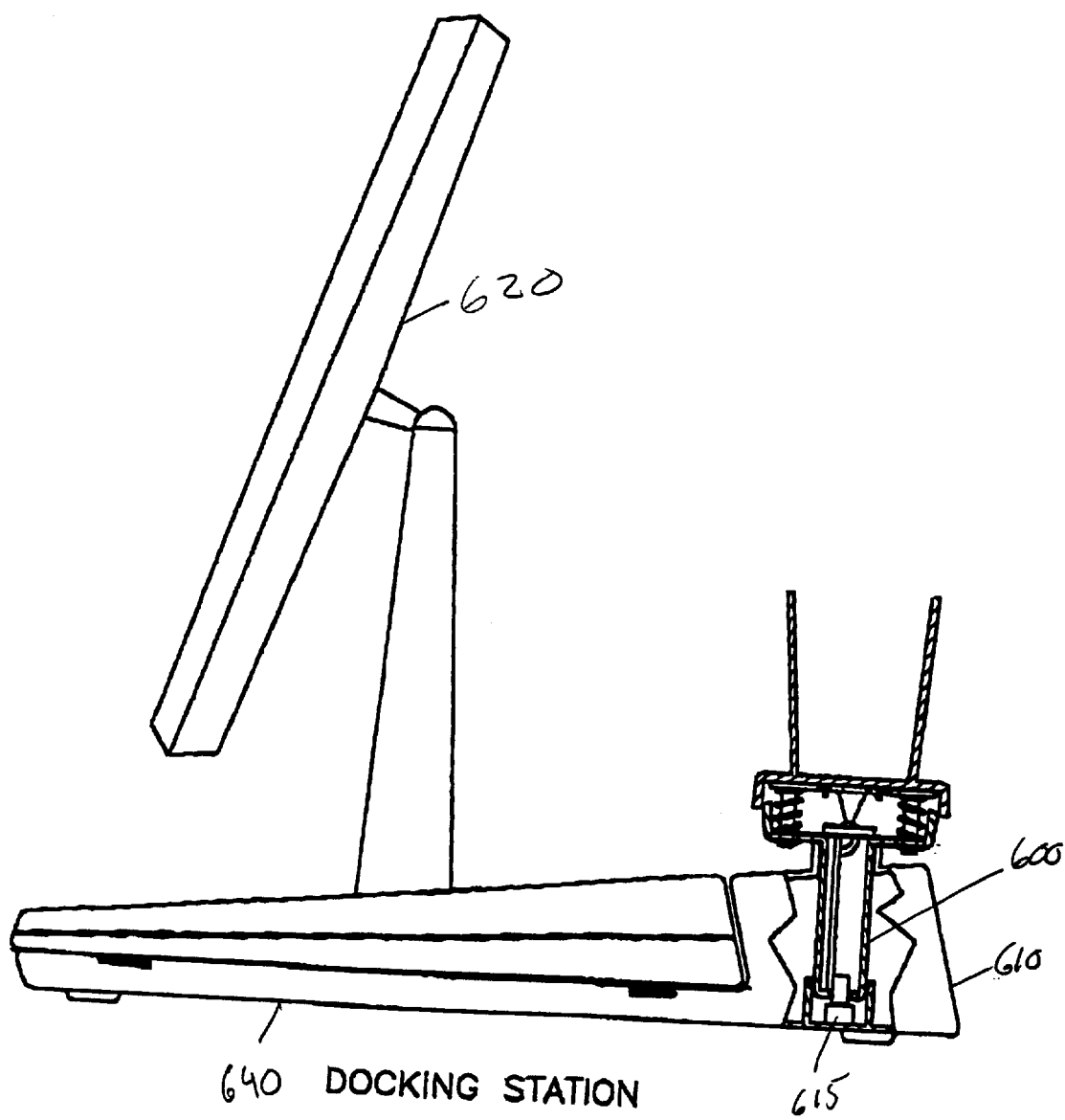
FIG. 30 shows another weighing arrangement of the present invention.

FIG. 30 shows another weighing arrangement of the present invention. This weighing arrangement includes an electronic scale cartridge 600 in accordance with any of the embodiments of the invention previously described herein. (While a configuration of the first embodiment is shown, those skilled in the art can appreciate that any configuration that conforms to the second embodiment of the scale cartridge of the present invention may also be used). The FIG. 30 arrangement also includes a docking station 610 adapted for adjacent placement to a piece of equipment 620, which is illustratively shown as a flat-panel display but may be any other piece of equipment. The docking station includes a complementary connector 615 adapted for removably mating with the scale connector. Connector 615 carries the signal to a processor as previously described. Preferably, for improved work-space integration the docking station may have a surface 640 for supporting the piece of equipment; however, those skilled in the art can appreciate that the invention may omit this feature if desired.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

For example, while various horizontally and vertically shaped cartridges have been disclosed, they are merely illustrative of the present invention. As those skilled in the art can appreciate, a housing of other any geometrical shape may be employed.

Also, while the various embodiments of the invention have been described as being connected to office equipment and various portable electronic devices, those skilled in the art can appreciate that the invention may also be adapted to other devices. For example, the scale cartridge of the invention may be adapted to connect to what is commonly referred to as an "all-in-one, integrated" personal computer, where the display, CPU, and input/output devices are all incorporated into a single housing. Also, the invention may be adapted to connected to any number of appropriately equipped analog or digital televisions and internet appliances.

What is claimed is:

1. An electronic scale cartridge, comprising:
a housing;
a platform for supporting an item;
a weighing unit mounted at least partially within the housing, said weighing unit including a force transducer which outputs a weight signal corresponding to a weight of said item supported on the platform; and
an electrical connector part in contact with said housing and adapted for removable coupling with a complementary connector part in a piece of office equipment, said electrical connector part including one of a plug and a receptacle and said complementary connector part including the other of said plug and receptacle, said electrical connector part supplying the weight signal output from said force transducer to the complementary connector of said piece of office equipment.

2. The scale cartridge of claim 1, wherein said piece of office equipment is selected from a group consisting a CRT monitor, a flat-panel display, a CPU unit, a printer, and a keyboard, said printer being of a type used for a personal computer.

3. An electronic scale cartridge, comprising:
a housing;
a platform for supporting an item;
a weighing unit mounted at least partially within the housing, said weighing unit including a force transducer which outputs a weight signal corresponding to a weight of said item supported on the platform; and
an electrical connector in contact with said housing and adapted for removable coupling with a complementary connector in a portable electronic device, said electrical connector supplying the weight signal output from said force transducer to the complementary connector of said portable electronic device, wherein said portable electronic device is selected from the group consisting of a personal digital assistant and a wireless communications device.

4. The scale cartridge of claim 1, wherein a portion of said housing is adapted for insertion into a slot formed along an exterior wall of said piece of office equipment.

5. The scale cartridge of claim 1, wherein the platform has a lower surface which applies a force directly against said force transducer when said item is placed on the platform.

6. The scale cartridge of claim 1, wherein the platform has a lower surface which includes a stub that applies a force against said force transducer when said item is placed on the platform.

7. The scale cartridge of claim 1, wherein said weighing unit includes two support members for supporting said platform, each of said two support members having a first end connected to the platform and a second end which deflects to allow the platform to impinge upon said force transducer when said item is placed on the platform.

8. The scale cartridge of claim 7, wherein a stub formed on a lower surface of the platform impinges on said force transducer.

9. The scale cartridge of claim 1, wherein the platform is circumscribed by said housing and has a surface which is raised relative to said housing.

10. The scale cartridge of claim 7, further comprising:
two bias springs mounted on respective ones of said two support members, said bias springs compressing to allow the platform to impinge upon the force transducer when said item is placed on the platform.

11. The scale cartridge of claim 1, further comprising:
a printed circuit board including a circuit for converting said weight signal to a format compatible with the complementary connector of said at least one of a piece of office equipment and a portable electronic device.

12. The scale cartridge of claim 1, wherein said weighing unit includes a support member in contact with the platform, said a force transducer mounted at a position proximate said support member, said support member applying a force against the force transducer when said item is placed on the platform.

13. The scale of claim 12, wherein the weighing unit further includes a pivot mount fixed to an interior surface of said housing, said support member having a first end rotatably connected to said pivot mount and a second end in contact with a bottom surface of the platform, and
wherein the force transducer outputs said weight signal when said support member applies a force against the force transducer under weight of said item on the platform.

14. The scale cartridge of claim 12, wherein said support member is removably connected to the platform to allow at least a second platform of a different dimension to be connected to said support member.

15. The scale cartridge of claim 12, wherein the platform forms a bottom surface of a container having side walls connected to the platform for holding said item.

16. A system for computing a postal or carrier rate, comprising:
an electronic scale cartridge which includes:
(a) a housing;
(b) a platform for supporting an item;
(c) a weighing unit mounted at least partially within the housing, said weighing unit including a force transducer which outputs a weight signal corresponding to a weight of said item supported on the platform; and
(d) a connector part for outputting the weight signal in contact with said housing,
a piece of equipment having a complementary connector part, said connector part of said cartridge adapted for removable coupling with said complementary connector part on said piece of equipment, said electrical connector part including one of a plug and a receptacle and said complementary connector part including the other of said plug and receptacle; and
a processor for computing a postal or private carrier rate for said item based on the weight signal output from said connector.

17. The system of claim 16, wherein said piece of equipment is one of a piece of office equipment and a portable electronic device.

18. A method for computing a postal or carrier rate, comprising:
connecting a removable scale cartridge to a piece of equipment, said removable scale cartridge including a housing, a platform for supporting an item, a weighing unit, and an electrical connector part in contact with said housing, said connector part of said scale cartridge adapted for removable coupling with said complementary connector part on said piece of equipment, said electrical connector part including one of a plug and a receptacle and said complementary connector part including the other of said plug and receptacle;
weighing an item on said scale to derive a weight signal;
conveying the weight signal to a processor; and
computing a postal or carrier rate based on the weight signal and said at least one parameter.

19. The method of claim 18, wherein said piece of equipment is on e of a piece of office equipment and a portable electronic device.

20. The method of claim 18, further comprising:
printing one of a label or envelope bearing a mark indicative of said postal or carrier rate.

21. The method of claim 18, wherein said computing step is performed in accordance with a computer program which causes a computer display to generate at least one display screen for allowing a user to enter said at least one parameter upon request, said computer further causing said computer display to display a weight of said item and said postal or carrier rate.

22. An electronic scale, comprising:
a housing;
a platform for supporting an item;
a weighing unit mounted at least partially within the housing, said weighing unit including a force transducer which outputs a weight signal corresponding to a weight of said item supported on the platform; and
a fastener which fastens the housing of said scale to a piece of office equipment in a manner which allows the piece of office equipment to support said scale.

23. An electronic scale comprising:
a housing;
a platform for supporting an item;
a weighing unit mounted at least partially within the housing, said weighing unit including a force transducer which outputs a weight signal corresponding to a weight of said item supported on the platform; and
a fastener which fastens the housing of said scale to a piece of equipment,
wherein said fastener rotatably connects the housing of said scale to said piece of equipment, to allow said scale to rotate into a desired position for weighing said item.

24. The scale of claim 22, wherein said fastener removably connects the housing of said scale to said piece of equipment.

25. The scale of claim 22, wherein said fastener includes snap members.

26. The scale of claim 25, wherein said snap members are formed on the housing of said scale and snap into complementary recesses in said piece of equipment to hold said scale into a desired position on said piece of equipment.

27. An electronic scale comprising:
a housing;
a platform for supporting an item;
a weighing unit mounted at least partially within the housing, said weighing unit including a force transducer which outputs a weight signal corresponding to a weight of said item supported on the platform; and
a fastener which fastens the housing of said scale to a piece of equipment, said fastener including snap members formed on the housing of said scale which snap into complementary recesses in said piece of equipment to hold said scale into a desired position on said piece of equipment,
wherein the snap members are rotatably connected to the housing of said scale, to allow said scale to rotate into a desired position for weighing said item when said snap members are snapped into the complementary recesses in said piece of equipment.

28. The scale of claim 22, wherein said fastener includes a magnet.

29. The scale of claim 28, wherein said magnet is mounted on the housing of said scale and said piece of equipment includes a metal plate, and wherein an attractive force between said magnet and said metal plate holds the scale onto said piece of equipment.

30. The scale of claim 22, wherein said fastener includes a pin.

31. The scale of claim 30, wherein the housing of said scale has at least one hole and the piece of equipment has at least one hole, said pin passing between the at least one hole in the housing of said scale and the at least one hole in the piece of equipment to fasten said scale to said piece of equipment.

32. The scale of claim 22, wherein said fastener is a screw.

33. The scale of claim 22, wherein said fastener is an adhesive.

34. An electronic scale comprising:
a housing;
a platform for supporting an item;
a weighing unit mounted at least partially within the housing, said weighing unit including a force transducer which outputs a weight signal corresponding to a weight of said item supported on the platform; and a fastener which fastens the housing of said scale to a piece of equipment, wherein said fastener is velcro.

35. The scale of claim 22, wherein said fastener is clip.

36. The scale of claim 25, wherein said clip is attached to the housing of said scale and clips to said piece of equipment.

37. The scale of claim 36, wherein said clip is spring biased to provide a pressurized attachment to said piece of equipment.

38. An electronic scale comprising:

a housing;

a platform for supporting an item;

a weighing unit mounted at least partially within the housing, said weighing unit including a force transducer which outputs a weight signal corresponding to a weight of said item supported on the platform;

a fastener which fastens the housing of said scale to a piece of equipment; and a connector for connected to said force transducer for outputting said weight signal, said connector mating with a complementary connector within said equipment housing, said fastener corresponding to a frictional connection between said connector and said complementary connector.

39. The scale of claim 22, further comprising:

a wire for conveying said weight signal, said wire extending from the housing of said scale and having a connector at a terminal end, said connector removably mating with a complementary connector in said piece of equipment.

40. The scale of claim 22, further comprising:

a transmitter circuit for transmitting said weight signal to a processor.

41. A weighing arrangement, comprising:

a piece of equipment;

a sheath attached to said piece of equipment, said sheath including a first connector;

an electronic scale cartridge adapted for insertion into said sheath, said scale cartridge having a second connector which mates with said complementary connector in said sheath, wherein said sheath is rotatably attached to said piece of equipment to a allow a user to adjust said scale into a level weighing position.

42. The weighing arrangement of claim 39, further comprising:

a fastener for removably attaching said sheath to said piece of equipment.

43. An electronic scale, comprising:

a housing;

a platform for supporting an item;

a weighing unit mounted at least partially within the housing, said weighing unit including a force transducer which outputs a weight signal corresponding to a weight of said item supported on the platform; and means for fastening the housing of said scale to a piece of office equipment in a manner which allows the piece of office equipment to support said scale.

44. A weighing arrangement, comprising: electronic scale cartridge which includes (a) a housing;

(b) a platform for supporting an item;

(c) a weighing unit mounted at least partially within the housing, said weighing unit including a force transducer which outputs a weight signal corresponding to a weight of said item supported on the platform; and (d) an electrical connector for outputting the weight signal; and a docking station for a personal computer or peripheral thereof, said docking station including a complementary connector adapted for removably mating with said scale connector, said scale connector supplying the weight signal output from said force transducer to the complementary connector of said docking station.

45. The weighing arrangement of claim 42, wherein said docking station includes a surface for supporting said piece of equipment.

46. The weighing arrangement of claim 33, wherein said docking station includes a slot for receiving the housing of said scale, said complementary connector being mounted at a bottom of the slot.

47. The scale cartridge of claim 1, wherein said housing is of a size which enables said housing to be supported by said piece of office equipment when said electrical connector part is removably mated with the complementary connector part in said piece of office equipment.

48. The system of claim 16, wherein said housing of said electronic scale is of a size which enables said electronic scale to be supported by said piece of equipment when said electrical connector part is removably mated with the complementary connector part in said piece of equipment.

* * * * *